United States Patent
Kim et al.

(10) Patent No.: US 8,530,098 B2
(45) Date of Patent: Sep. 10, 2013

(54) ELECTROLYTE FOR RECHARGEABLE LITHIUM BATTERY AND RECHARGEABLE LITHIUM BATTERY COMPRISING SAME

(75) Inventors: Jin-Hee Kim, Suwon-si (KR); Jin-Sung Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 811 days.

(21) Appl. No.: 12/782,561

(22) Filed: May 18, 2010

(65) Prior Publication Data

US 2010/0227227 A1    Sep. 9, 2010

Related U.S. Application Data

(62) Division of application No. 10/980,116, filed on Nov. 1, 2004, now Pat. No. 7,745,055.

(30) Foreign Application Priority Data

Oct. 31, 2003 (KR) .................. 10-2003-0076913
Aug. 20, 2004 (KR) .................. 10-2004-0065773

(51) Int. Cl.
*H01M 6/18* (2006.01)

(52) U.S. Cl.
USPC ............ 429/307; 429/327; 429/232; 429/199

(58) Field of Classification Search
USPC .................................. 429/307, 327, 232, 199
See application file for complete search history.

(56) References Cited

U.S. PATENT DOCUMENTS

| | | | |
|---|---|---|---|
| 4,489,145 A | 12/1984 | Abraham et al. |
| 4,943,497 A | 7/1990 | Oishi et al. |
| 5,879,834 A | 3/1999 | Mao |
| 6,074,777 A | 6/2000 | Reimers et al. |
| 6,942,949 B2 | 9/2005 | Besenhard et al. |
| 7,223,500 B2 | 5/2007 | Noh et al. |
| 7,294,436 B2 | 11/2007 | Abe et al. |
| 7,316,868 B2 | 1/2008 | Gorkovenko |
| 2001/0024757 A1 | 9/2001 | Hwang et al. |
| 2002/0034691 A1 | 3/2002 | Segawa |
| 2002/0045102 A1 | 4/2002 | Jung et al. |
| 2003/0118912 A1 | 6/2003 | Watanabe et al. |
| 2003/0157411 A1 | 8/2003 | Jung et al. |
| 2004/0259002 A1 | 12/2004 | Kim et al. |

FOREIGN PATENT DOCUMENTS

| | | |
|---|---|---|
| CN | 1334614 | 2/2002 |
| CN | 1336696 | 2/2002 |
| CN | 1419309 | 5/2003 |
| CN | 1430306 | 7/2003 |
| JP | 61-230276 | 10/1986 |
| JP | 1-206571 | 8/1989 |
| JP | 6-333596 | 12/1994 |
| JP | 6-338347 | 12/1994 |
| JP | 7-302614 | 11/1995 |
| JP | 7-320779 | 12/1995 |
| JP | 8-64238 | 3/1996 |
| JP | 8-321312 | 12/1996 |
| JP | 9-50822 | 2/1997 |
| JP | 9-73918 | 3/1997 |
| JP | 9-106835 | 4/1997 |
| JP | 9-171840 | 6/1997 |
| JP | 10-50342 | 2/1998 |
| JP | 10-321258 | 12/1998 |
| JP | 11-162512 | 6/1999 |
| JP | 2939469 | 6/1999 |
| JP | 2000-58117 | 2/2000 |
| JP | 2001-126761 | 5/2001 |
| JP | 2002-075446 | 3/2002 |
| JP | 2004-134261 | 4/2004 |
| KR | 10-0328235 | 2/2001 |
| KR | 2003-0051609 | 6/2003 |
| KR | 2003-0061218 | 7/2003 |
| KR | 2003-0061219 | 7/2003 |
| WO | WO 02/059999 A1 | 8/2002 |

OTHER PUBLICATIONS

Patent Abstracts of Japan, Publication No. 2004-134261;dated Apr. 30, 2004; in the name of Toru Matsui et al.
Korean Patent Abstracts, Publication No. 10-0328235; dated Feb. 26, 2001, in the name of Kazuya Iwamoto et al.
Korean Patent Abstracts, Publication No. 1020030061218, dated Jul. 18, 2003, in the name of Sang Hun Choi et al.
Korean Patent Abstracts, Publication No. 1020030061219, dated Jul. 18, 2003, in the name of Sang Hun Choi et al.
Megahed, et al., "Lithium-ion rechargeable batteries" J. Power Sources, 51(1994) pp. 79-104.
Yang, et al., "Composition analysis of the passive film on the carbon electrode of a lithium-ion battery with an EC-based electrolyte" Journal of Power Sources 72 (1998) pp. 66-70.
Patent Abstract of Japan 06-333596, Published Dec. 2, 1994, in the name of Yamazaki, et al.
Patent Abstract of Japan 07-320779, Published Dec. 8, 1995, in the name of Yamazaki, et al.
Patent Abstract of Japan 08-064238, Published Mar. 8, 1996, in the name of Uehara, et al.
Patent Abstract of Japan, Publication No. 10-321258, dated Dec. 4, 1998, in the name of Huanyu Mao, et al.
Patent Abstract of Japan, Publication No. 2000-058116, dated Feb. 25, 2000, in the name of Masatoshi Takahashi, Corresponds to JP Unexamined 2939469, Published Jun. 11, 1999.
Patent Abstract of Japan, Publication No. 11-162512, dated Jun. 18, 1999, in the name of Jan Naess Reimers, et al.
Patent Abstract of Japan, Publication No. 2000-058117, dated Feb. 25, 2000, in the name of Masatoshi Takahashi, et al.
Patent Abstracts of Japan, Publication No. 2001-126761; dated May 11, 2001, in the name of Minoru Kotado et al.

(Continued)

*Primary Examiner* — Laura Weiner
(74) *Attorney, Agent, or Firm* — Christie, Parker & Hale, LLP

(57) ABSTRACT

Disclosed is an electrolyte for a rechargeable lithium battery including: a first additive having an oxidation potential of 4.1 to 4.6V; a second additive having an oxidation potential of 4.4 to 5.0V; a non-aqueous organic solvent; and a lithium salt.

2 Claims, 5 Drawing Sheets

(56) References Cited

OTHER PUBLICATIONS

U.S. Notice of Allowance dated Feb. 17, 2010, for parent U.S. Appl. 10/980,116.
U.S. Office action dated Jul. 16, 2010, for cross-reference U.S. Appl. 12/782,511.
Patent Abstract of Japan 08-321312, Published Dec. 3, 1996, in the name of Jinno, et al.
Patent Abstract of Japan 09-073918, Published Mar. 18, 1997, in the name of Ogawa, et al.
U.S. Office action dated Sep. 17, 2008, for related U.S. Appl. No. 10/980,116.
U.S. Office action dated Jan. 29, 2009, for related U.S. Appl. No. 10/980,116.
U.S. Office action dated Jun. 11, 2009, for related U.S. Appl. No. 10/980,116.
U.S. Office action dated Aug. 16, 2007, for related U.S. Appl. No. 10/817,761.
U.S. Office action dated Dec. 18, 2007, for related U.S. Appl. No. 10/817,761.
U.S. Office action dated May 29, 2008, for related U.S. Appl. No. 10/817,761.
U.S. Office action dated Nov. 3, 2008, for related U.S. Appl. No. 10/817,761.
U.S. Office action dated Mar. 25, 2009, for related U.S. Appl. No. 10/817,761.
European Search Report dated Dec. 4, 2006, for 04090417.9, in the name of Samsung SDI Co., Ltd.
Matsuda, Y., et al., *Organic Additives for the Electrolytes of Rechargeable Lithium Batteries*, Journal of Power Sources, vol. 26, 1989, pp. 579-583.
Patent Abstract of Japan, Publication No. 01-206571, dated Aug. 18, 1989, in the name of Kuzhikalail M. Abraham, et al.
Patent Abstract of Japan, Publication No. 06-338347, dated Dec. 6, 1994, in the name of Momoe Saitou, et al.
Patent Abstract of Japan, Publication No. 07-302614, dated Nov. 14, 1995, in the name of Ryuichi Shimizu, et al.
Patent Abstract of Japan, Publication No. 09-050822, dated Feb. 18, 1997, in the name of Ryuichi Shimizu.
Patent Abstract of Japan, Publication No. 09-106835, dated Apr. 22, 1997, in the name of Huanyu Mao.
Patent Abstract of Japan, Publication No. 09-171840, dated Jun. 30, 1997, in the name of Huanyu Mao, et al.
Patent Abstract of Japan, Publication No. 10-050342, dated Feb. 20, 1998, in the name of Takayuki Yamahira.
U.S. Office action dated Oct. 15, 2010, for cross reference U.S. Patent application 12/782,511.
U.S. Office Notice of Allowance dated Feb. 7, 2011, for cross reference U.S. Patent application 12/782,511.

ELECTROLYTE FOR RECHARGEABLE LITHIUM BATTERY AND RECHARGEABLE LITHIUM BATTERY COMPRISING SAME

CROSS REFERENCE TO RELATED APPLICATION

This application is a divisional of U.S. patent application Ser. No. 10/980,116, filed Nov. 1, 2004, now issued as U.S. Pat. No. 7,745,055, which claims priority to and is based on Korean patent application No. 10-2003-0076913 filed in the Korean Industrial Property Office on Oct. 31, 2003 and Korean patent application No. 10-2004-0065773 filed in the Korean Industrial Property Office on Aug. 20, 2004, the entire contents of all of which are incorporated hereinto by reference.

FIELD OF THE INVENTION

The present invention relates to an electrolyte for a rechargeable lithium battery and a rechargeable lithium battery comprising the same. More particularly, it is directed to an electrolyte for a rechargeable lithium battery capable of preventing the battery from being overcharged, providing good cycle-life characteristics to the battery, and permitting safe storage of a battery when stored at high temperature. It is still further directed to a rechargeable lithium battery having such properties.

DESCRIPTION OF THE RELATED ART

The use of portable electronic instruments is increasing as electronic equipment gets smaller and lighter due to developments in high-tech electronic industries. Studies on lithium secondary batteries are actively being pursued in accordance with the increased need for batteries having high energy density for use as power sources in these portable electronic instruments. For responding to the demands for high voltage and high energy density, rechargeable batteries having non-aqueous electrolytes, positive active materials of lithium-included metal oxides having a voltage of 4V, and negative active materials of carbonaceous materials capable of intercalating and deintercalating the lithium have been suggested.

The non-aqueous electrolyte for the rechargeable battery is required for safety. Particularly, for a rechargeable lithium ion battery, the lithium metal may be deposited on the surface of the negative electrode or the lithium may be occluded in the negative electrode at more than a desirable amount when the rechargeable lithium ion battery is overcharged, for example, where there are problems with the charge control circuit. In such a situation, too many lithium ions are transferred from the positive electrode to the negative electrode. This causes the internal resistance of the battery to increase as the battery continues to be charged and generates a large amount of heat. In the worst case, it may cause thermal runaway.

In order to prevent such an extraordinary exothermal phenomenon, battery safety can be enhanced by mounting a thermo-sensitive current disconnect switch such as a PTC (positive temperature coefficient thermistor) outside of the battery in order to ensure disconnection of the current. Further, in order to solve the overcharge problems, U.S. Pat. No. 4,943,497 discloses means for stopping the charge current as soon as a change of internal pressure is sensed in the battery. However, it is difficult to recoup the cost of a mechanical current disconnect mechanism, and it is also difficult to insert such a mechanical device inside of a battery, especially considering the tendency toward smaller and thinner batteries.

Accordingly, Japanese Patent laid-open publication Nos. H01-206571, H06-338347, and H07-302614 disclose a method of self-consuming the electric energy with a redox shuttle by adding an additive causing a reversible redox reaction in an electrolyte. However, this method cannot ensure safety since the electric charge transferring reaction speed and the transferring speed of lithium ions are limited when the overcharge current increases. On this point, Japanese Patent laid-open publication Nos. H09-50822, H 10-50342, and H10-321258, U.S. Pat. No. 2,939,469, and laid-open publication No. 2000-58117 disclose that an aromatic compound having a methoxyl group and a halogen atom, biphenyl, thiophen, or an aromatic ether compound is added to an electrolyte, which polymerizes, thereby stopping the temperature from further increasing to order to secure safety. Further, Japanese Patent laid-open publication Nos. H09-106835, H09-171840 and H10-321258 disclose that biphenyl, 3-R-thiopen, 3-chlorothiopen, and furane are polymerized during overcharge, thereby securing safety.

However, an additive such as biphenyl has shortcomings in that it may gradually decompose when the charge and discharge voltage is not uniform or when an increase in voltage occurs unexpectedly and quickly. The amount of the additive also tends to gradually decrease when the battery is discharged at a high temperature of more than 40° C. Such an additive is generally unable to ensure battery safety after 300 charge and discharge cycles and it also deteriorates the cycle-life characteristics. Furthermore, such an additive has poor high-temperature storage characteristics. Such problems are more severe as the amount of additive increases (Japanese Patent laid-open publication No. H11-162512).

To address the deterioration in the cycle-life characteristics associated with the use of biphenyl, it is proposed to use 2,2-diphenlypropane in Japanese Patent laid-open publication No. H11-162512. However, 2,2-dipehenylpropane only slightly improves the cycle-life characteristics, and does not provide as high a level of safety as a biphenyl. Most significantly, with the use of the 2,2-diphenylpropane, the cycle-life characteristics deteriorate significantly.

SUMMARY OF THE INVENTION

In one embodiment of the present invention an electrolyte is provided for a rechargeable lithium battery exhibiting good safety without thermal runaway during overcharging and having good cycle-life characteristics, good high-temperature storage characteristics, and good stability.

In another embodiment of the invention a rechargeable lithium battery is provided that includes such an electrolyte.

In one embodiment, an electrolyte is provided for a rechargeable lithium battery including a first additive having an oxidation potential of 4.1 to 4.6V, a second additive having an oxidation potential of 4.4 to 5.0V, a non-aqueous organic solvent, and a lithium salt. The first additive is preferably a compound represented by Formula 2 below, and the second additive is preferable a compound represented by Formula 5 below:

Formula 2:

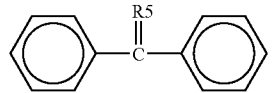

wherein R5 is a $C_1$-$C_6$ alkyl group or a $C_2$-$C_6$ alkylene group.

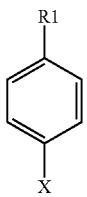

Formula: 5 wherein X is Cl, Br or F, and R1 is hydrogen, a $C_1$-$C_6$ alkyl group or an alkylene group.

The oxidation potential for the electrolyte is preferably between 4.4 and 4.8V.

The present invention also provides a rechargeable lithium battery including the electrolyte, a positive electrode, and a negative electrode. The positive electrode and the negative electrode include active materials capable of reversibly intercalating and deintercalating lithium ions. At least one of the positive electrode and the negative electrode includes a water-soluble binder and a water-soluble agent for increasing viscosity.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION

Figure 1:
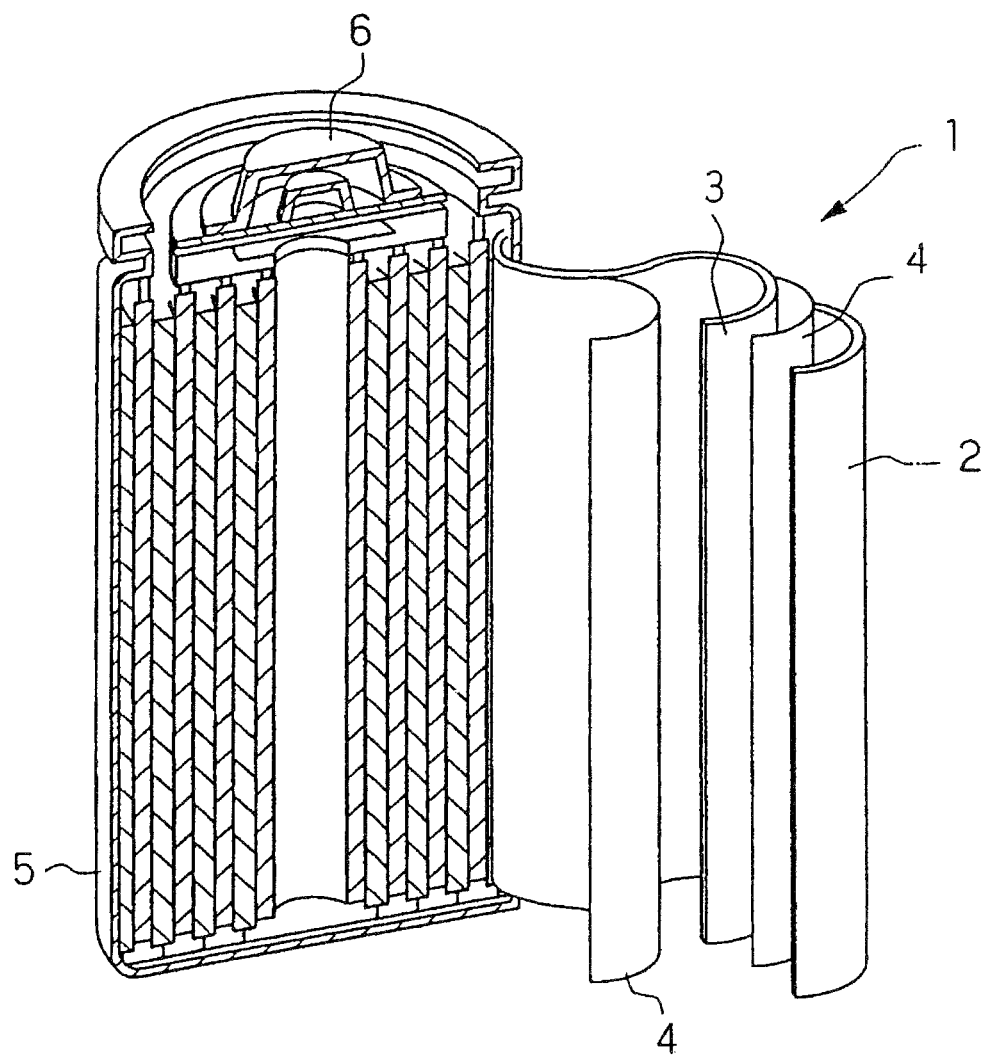
FIG. 1 is a schematic view showing a rechargeable lithium battery according to the present invention.

The present invention relates to an electrolyte for a rechargeable lithium battery that is capable of providing the battery with improved safety upon an overcharge condition, and good high temperature storage and cycle-life characteristics.

In order to ensure safety in the event of overcharge, the electrolyte of the present invention includes at least two different kinds of organic compounds having HOMO (Highest Occupied Molecular Orbital) values higher than those of conventional carbonates. The at least two different organic compounds also have different oxidation potential values from each other.

In one embodiment, the electrolyte of the present invention includes a first additive having a low oxidation potential of 4.1 to 4.6V (referred to herein as a "lower potential-overcharge additive"), and a second additive having a high oxidation potential of 4.4 to 5.0V (referred to herein as a "higher potential-overcharge additive"). The second additive has an oxidation potential higher than that of the first additive. For example, the first additive is selected to have an oxidation potential of lower than 4.4V when the oxidation potential of the second additive is 4.4V, and the second additive is selected to have an oxidation potential of higher than 4.6V when the oxidation potential of the first additive is 4.6V.

More preferably, the higher potential-overcharge additive has an oxidation potential of 4.6 to 5.0V, and most preferably 4.7 to 4.9V. The lower potential-overcharge additive more preferably has an oxidation potential of 4.1V to 4.6V, and most preferably 4.2V to 4.4V. Further, the potential difference between the higher potential-overcharge additive and the lower potential-overcharge additive is in a range of between 0.1 and 0.7V, and preferably between 0.3 and 0.7V.

Further, the electrolyte which includes the higher potential-overcharge additive and the lower potential-overcharge additive preferably has an oxidation potential of 4.4 to 4.9V, and more preferable 4.5 to 4.7V when the electrolyte includes a carbonate-based solvent as an organic solvent. Such an oxidation potential may be varied depending on the kind of organic solvents used in the electrolyte and thus, as the standard solvent, the present invention employs a carbonate-based solvent as an organic solvent used in the electrolyte. However, it is not limited to the organic solvent used in the electrolyte. Therefore, regardless of the kind of organic solvent used in electrolytes of batteries, when an electrolyte includes the inventive higher and lower potential-overcharge additives, it is expected to have the oxidation potential if the carbonate-based organic solvent is used as the organic solvent.

Oxidation potential is the potential at which an oxide reaction starts and a voltage at which decomposition begins. The voltage at which decomposition starts indicates a potential at which the current value variation of 0.00001 A/cm2 begins at a room temperature of 20 to 25° C. under an air atmosphere. The amount of the additive is 1% or more by weight based on the total weight of the electrolyte. If the amount is less than 1% by weight, the peak value changing the current value is difficult to monitor using the naked eye.

The HOMO (Highest Occupied Molecular Orbital) is the outermost (highest energy) orbital containing electrons. Accordingly, if any molecule is to lose an electron, it would most likely lose it from the outermost orbital. A material with a high HOMO value oxidizes easily, but a material with a low HOMO value is difficult to oxidize. All additives used in the present invention have a HOMO value of between −9 and −8 eV, which is higher than that of between −12 and −11 eV of the carbonate-based organic solvent. These values are determined according to PM3 (Parametric Method Number 3) of the semi-empirical molecular orbital calculating method.

The lower potential-overcharge additive may include at least one compound represented by the following Formulae 1 and 2:

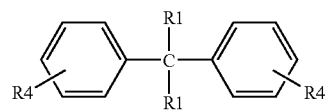

Formula 1

Formula 2

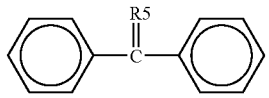

wherein R1 is hydrogen, a $C_1$-$C_6$ alkyl group, or a $C_2$-$C_6$ alkylene group; R4 is a $C_1$-$C_6$ alkyl group, —OOCR6 (wherein R6 is hydrogen, a $C_1$-$C_6$ alkyl group, a $C_2$-$C_6$ alkylene group), or —OR7 (wherein R7 is hydrogen, a $C_1$-$C_6$ alkyl group or a $C_2$-$C_6$ alkylene group); and R5 is a $C_1$-$C_6$ alkyl group or a $C_2$-$C_6$ alkylene group.

Exemplary compounds represented by Formula 1 may include, for example, compounds represented by Formulae 3 and 4:

Formula 3:

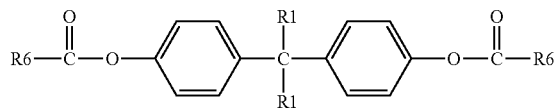

Formula 4:

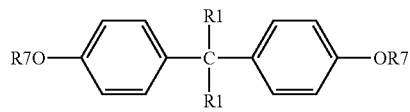

where R1 is defined as for Formula 1; R6 is hydrogen, a $C_1$-$C_6$ alkyl group or a $C_2$-$C_6$ alkylene group; and R7 is hydrogen, a $C_1$-$C_6$ alkyl group or a $C_2$-$C_6$ alkylene group.

In addition, the higher potential-overcharge additive may include at least one of compounds represented by one of Formulae 5 to 9:

Formula 5:

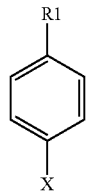

Formula 6:

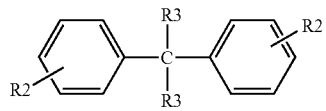

Formula 7:

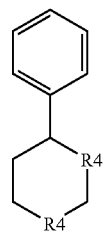

Formula 8:

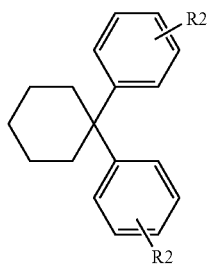

Formula 9:

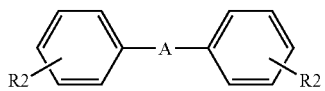

wherein X is Cl, Br, or F; R1 is a $C_1$-$C_6$ alkyl group or an alkylene group; R2 is a $C_1$-$C_6$ alkyl group, an alkoxy group, or an alkylene group; R3 is a $C_1$-$C_6$ alkyl group or a $C_2$-$C_6$ alkylene group; R4 is selected from the group consisting of $C_1$-$C_6$ alkyl groups, —OOCR6 where R6 is selected from the group consisting of hydrogen, $C_1$-$C_6$ alkyl groups, and $C_2$-$C_6$ alkylene groups, and —OR7 where R7 is selected from the group consisting of hydrogen, $C_1$-$C_6$ alkyl groups and $C_2$-$C_6$ alkylene groups; and A is $SO_2$, $CH_2C=O$, or $CF_2$.

Exemplary compounds represented by the Formulae 6 to 8 includes, for example, compounds represented by Formulae 10 to 13:

Formula 10

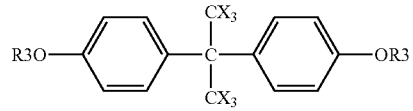

Formula 11

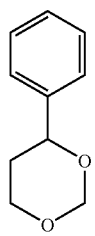

Formula 12

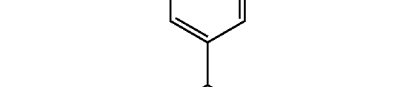

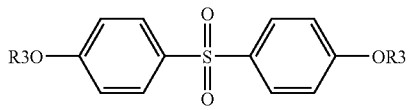

Formula 13 wherein, X is Cl, Br, or F; and R3 is a $C_1$-$C_6$ alkyl group or a $C_2$-$C_6$ alkylene group.

Most preferably, the lower potential-overcharge additive is a compound represented by Formula 2, and the higher potential-overcharge additive is a compound represented by Formula 5.

If only a lower potential-overcharge additive is used, it is generally added in an amount of 1% by weight or more to obtain the safety improvement effects during overcharge. However, such an additive may partially react with the active material to coat the surface of the active material, thereby dramatically deteriorating the battery performance when the battery is placed at a high temperature (80-90° C.). Further, as the charge and discharge cycles are repeated, the volumes of the negative electrode and the positive electrode are repeatedly constricted and expanded to cause local imbalances of the negative electrode and the positive electrode. Thereby, the partial difference of the potential may cause deterioration of the cycle-life characteristics of the battery since the additive having a low oxide potential intended to improve safety during overcharging decomposes earlier than others. Further, when only a higher potential-overcharge additive is used, it may cause problems in that the safety during the overcharge is not fully ensured since the reactive potential of the additive is too high during overcharge.

The electrolyte according to the present invention including both the first additive and the second additive at an appropriate ratio. This combination ensures safe operation during overcharge, while still providing good cycle-life and good high-temperature storage and stability characteristics. According to the present invention, two or more overcharge additives having different oxidation potentials are used as the overcharge additive. Specifically, the additive having the low oxidation potential is added in very small amounts to maintain good stability of storage at high temperatures. The additive having a relatively higher oxidation potential ensures safety by reacting earlier during overcharge. Therefore, both recovery on storage and safety during overcharge can be satisfied, which are not achieved when only one of the additives is used.

According to the present invention, the electrolyte preferably includes 0.01 to 20% by weight of the higher potential-overcharge additive and the lower potential-overcharge additive combined, more preferably 0.1 to 10% by weight, and most preferably 5 to 10% by weight. When the combined amounts of the higher potential-overcharge additive and the lower potential-overcharge additive are less than 0.01% by weight, it is difficult to achieve satisfactory effects during overcharge. When the combined amount is more than 20% by weight, the cycle-life characteristics deteriorate remarkably.

The weight ratio of the higher potential-overcharge additive to the lower potential-overcharge additive is preferably in the range of 20:0.1 to 3:2, and more preferably 10:0.1 to 4:1. On calculating the weight ratio, the amount of the lower potential-overcharge additive is 0.01 to 5% by weight in the electrolyte, and that of the higher potential-overcharge additive is 1 to 20% by weight.

As mentioned above, the compound represented by Formula 2 is preferably used for the lower potential-overcharge additive, and the compound represented by Formula 5 is preferably used for the higher potential-overcharge additive. The weight ratio of the higher potential-overcharge additive to the lower potential-overcharge additive is preferably between 10:0.1 to 0.2, more preferably between 7.5:0.1 to 0.2, and most preferably between 5:0.1 to 0.2. When the mixing ratio of the higher potential-overcharge additive and the lower potential-overcharge additive are present in the preferred range, overcharge safety is improved as are the cycle-life characteristics and the recovery characteristics of a battery at high temperature storage.

The electrolyte of the present invention further includes a non-aqueous organic solvent and a lithium salt. The non-aqueous organic solvent acts a medium capable of transmitting ions taking part in the electrochemical reaction of the battery. The non-aqueous organic solvent may include a carbonate, ester, ether, or ketone. The carbonate may include, but is not limited to, dimethyl carbonate, diethyl carbonate, dipropyl carbonate, methylpropyl carbonate, ethylpropyl carbonate, methylethyl carbonate, ethylene carbonate, propylene carbonate, butylene carbonate, and so on. The ester may include, but is not limited to, γ-butyrolactone, n-methyl acetate, n-ethyl acetate, n-propyl acetate and so on. The ester may be dibutyl ether and the ketone may be polymethylvinyl ketone. The carbonate solvent of the non-aqueous organic solvent is preferably prepared by mixing a cyclic carbonate and a chain carbonate. Preferably, the cyclic carbonate is mixed with the chain carbonate at a volume ratio of between 1:1 and 1:9. The electrolyte properties can be improved when the mixing ratio of the cyclic carbonate and the chain carbonate are within this range.

The non-aqueous organic solvent may further include an aromatic hydrocarbon organic solvent. In this case, a carbonate organic solvent is preferred. The aromatic hydrocarbon organic solvent may include compounds represented by Formula 14:

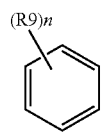

Formula 14 wherein, R9 is a halogen or a $C_1$-$C_{10}$ alkyl group and n is an integer between 0 and 6. The aromatic hydrocarbon organic solvent may include, but is not limited to benzene, fluorobenzene, chlorobenzene, nitro benzene, toluene, fluorotoluene, trifluorotoluene, xylene, and so on. The electrolyte including the aromatic hydrocarbon organic solvent is preferably composed of a carbonate solvent/aromatic hydrocarbon solvent in a volume ratio of between 1:1 and 30:1. The properties of the electrolyte can be improved when the volume ratio is in this range.

The lithium salt acts as a source for supplying lithium ions in the battery, and helps the battery operation. The non-aqueous organic solvent acts as a medium for the ions which take part in the electrochemical reaction. The lithium salts may include, but are not limited to, at least one of $LiPF_6$, $LiBF_4$, $LiSbF_6$, $LiAsF_6$, $LiClO_4$, $CF_3SO_3Li$, $LiN(SO_2CF_3)_2$, $LiC_4F_9SO_3$, $LiAlO_4$, $LiAlOCl_4$, $LiN(SO_2C_2F_5)_2$, $LiN(C_xF_{2x+1}SO_2)(C_yF_{2y+1}SO_2)$ (wherein x and y are natural numbers), LiCl, and LiI.

The concentration of the lithium salt is preferably between 0.1 and 2.0M. When the concentration of the lithium salt is less than 0.1M, the conductivity of the electrolyte is decreased, deteriorating the electrolyte properties. When the concentration is more than 2.0M, the viscosity of the electrolyte may increase, decreasing the transmittance of lithium ions.

The rechargeable lithium battery according to the present invention includes the electrolyte of the present invention, a negative electrode and a positive electrode. The positive electrode includes a positive active material capable of reversibly intercalating and deintercalating lithium ions. The positive active material may include lithiated intercalation oxides.

The negative electrode may include a negative active material capable of intercalating and deintercalating lithium ions. The negative active material may include a carbonaceous negative active material of a crystalline or amorphous carbon, or a carbon complex (for example, thermally decomposed carbon, cokes, graphite), a fired organic polymer compound, carbon fiber, a zinc oxide compound, lithium metal or a lithium alloy. The preferred negative active material is a crystalline carbon, and more preferably a graphite having an Lc (crystallite size) of 150 Å or more and preferably between 150 and 3000 Å, a d(002) of between 3.35 and 3.38 Å of X-ray diffraction plane distance at the (002) plane, a true density of 2.2 g/cm$^3$ or more and preferably between 2.2 and 2.3 g/cm$^3$, a BET (specific surface area) of between 0.5 and 50 m$^2$/g, and an average particle diameter (D50) of between 1 and 30 μm. Furthermore, the negative active material preferably has an intensity ratio Ra I(I(1360 cm$^{-1}$)/I(1580 cm$^{-1}$)) of a Raman Spectroscopy peak intensity I(1360) at a (1360) plane to an Raman Spectroscopy peak intensity I(1590) at a (1590) plane of 0.05 or more, and more preferably, between 0.05 and 0.5. The negative active material of the present invention preferably has an X-ray diffraction peak intensity ratio I(110)/(002) of an X-ray diffraction peak intensity (110) at a (110) plane to an X-ray diffraction peak intensity I(002) at a (002) plane of 0.2 or less, and more preferably between 0.006 and 0.2.

The battery according to the present invention may further include a binder. The binder both helps to bind the active material particles to one another and to bind the positive active material to a current collector. The binder may include any material used a the conventional rechargeable lithium battery. Examples include those soluble in organic solvents or in water. Binders soluble in organic solvents include, but are not limited to, polytetrafluoro ethylene polyvinylidene fluoride, polyethylene, polypropylene, polyvinyl chloride, polyvinyl pyrrolidone, and polyvinyl alcohol.

Binders soluble in water include, but are not limited to, styrene-butadiene rubber, polysodium acrylate, propylene and C2-8 olefin copolymer and (meth)acrylic acid and (meth)acrylic alkyl ester copolymers.

Binders soluble in water may further include a water-soluble agent for increasing viscosity in order to increase the binding property. The water-soluble agent for increasing viscosity may include a cellulose-based compound. The cellulose compound may include, but is not limited to, carboxylmethyl cellulose, hydroxylpropyl cellulose, hydroxylpropyl methyl cellulose, hydroxylethyl cellulose, hydroxylpropyl ethyl cellulose, or methyl cellulose. In addition, it may include an alkaline metal salt thereof. The alkaline metal salt may include an alkali metal such as Na, K, or Li. When the cellulose-based compound with an alkaline metal salt is used, the discharge property of the battery at a high rate is improved more than by using only a cellulose-based compound without the alkaline metal.

The rechargeable lithium battery of the present invention may further include a separator for preventing a short between the positive electrode and the negative electrode. The separator may include any conventional material such as a polymer membrane of polyolefin, polypropylene, polyethylene, or other polymer materials, or a multi-layer polymer membrane, a micro-porous film, or a fabric or non-fabric membrane.

The rechargeable lithium battery including the electrolyte, the positive electrode, the negative electrode, and the separator has a structure such as a unit cell of positive electrode-separator-negative electrode, a bicell of positive electrode-separator-negative electrode-separator-positive electrode, or a lamination cell such that the unit cell is repeated.

A representative lithium battery of the present invention is shown in FIG. 1. FIG. 1 shows a cylindrical lithium ion battery 1 including a negative electrode 2; a positive electrode 3; a separator 4 interposed between the negative electrode 2 and the positive electrode 3. An electrolyte is injected around the negative electrode 2, the positive electrode 3, and the separator 4 which are placed within a battery container 5 with a sealing member 6 for sealing the battery container 5. However, the rechargeable lithium battery is not limited to the structure shown in FIG. 1, and can be varied to any shape such as a prismatic, or a pouch shaped battery.

The following examples further illustrate the present invention, but the invention is not to be limited by these examples.

EXAMPLES 1 TO 10 AND COMPARATIVE EXAMPLE 1

An electrolyte solution was prepared by dissolving 1M LiPF6 in a mixed solvent of ethylene carbonate and ethylmethyl carbonate (in a 1:1 volume ratio). To this was added 2% by weight of an additive represented Formulae 1 to 10 as shown in Table 1 to provide electrolyte solutions for Examples 1 to 10, respectively. Comparative Example 1 is an electrolyte solution including 1M LiPF6 dissolved in the mixed solvent of ethylene carbonate and methylethyl carbonate (in a 1:1 volume ratio) without the additive.

The resulting electrolyte solutions were measured for oxidation potential (Linear Sweep Voltametry: LSV) by an electrochemical analyzer (Potensiostat Model 273A, EG&G) at room temperature (25° C.). The working electrode was made of a platinum electrode having a diameter of 1 mm, and the reference electrode and the counter electrode were made of lithium. The voltage range was between 3 and 7V and the scan rate was 1 mV/s. The values obtained were rounded to the three decimal places. The tests were carried out at room temperature of 25° C. in a sealed dry room. The results show that compounds represented by Formulae 2 to 5 and 10 to 13 of Examples 1 to 10 are decomposed earlier than that of the carbonate organic solvent of Comparative Example 1. The decomposition voltages are defined as where the potential starting the change at 0.00001 A/cm2, are shown in the following Table 1. Further, HOMOs of Examples 1 to 10 and Comparative Example 1 are shown in the following Table 1. The HOMOs were determined by PM3 (Parametric Method Number 3) of the semi-empirical molecular orbital calculation method.

TABLE 1

| | Electrolyte (1M LiPF$_6$) adding with ethylene carbonate:ethylmethyl carbonate = 1:1, in amount of 2 wt. % | HOMO value (eV) | LSV decomposition start voltage (V) |
|---|---|---|---|
| Comparative Example 1 | — | Ethylene carbonate (−11.78), ethylmethyl carbonate (−11.52) | 5.64 |
| Example 1 (Formula 5) | 4-chlorotoluene | −9.25 | 4.73 |
| Example 2 (Formula 5) | 4-bromotoluene | −9.52 | 4.73 |
| Example 3 (Formula 5) | 4-fluorotoluene | −9.49 | 4.70 |
| Example 4 (Formula 10) | 4,4'-(hexafluoro isopropylidene) diphenol | −9.58 | 4.42 |
| Example 5 (Formula 11) | 4-phenyl-1,3-dioxane | −9.75 | 4.80 |
| Example 6 (Formula 12) | 4,4-cyclohexylidene bisphenol | −8.88 | 4.41 |
| Example 7 (Formula 13) | bisphenol S(4,4'-sulphonyl diphenol) | −9.70 | 4.80 |
| Example 8 (Formula 3) | bisphenol A diacetate | −9.17 | 4.26 |
| Example 9 (Formula 4) | bisphenol A | −8.89 | 4.25 |
| Example 10 (Formula 2) | 1,1-diphenyl ethylene | −9.04 | 4.26 |

As shown in Table 1, the compounds represented by Formulae 2 to 5 and 10 to 13 started to decompose earlier than that of the carbonate-based organic solvent, they had lower LSV decomposition start voltages, and the oxide reactions occurred at the LSV decomposition start voltages.

Figure 2:
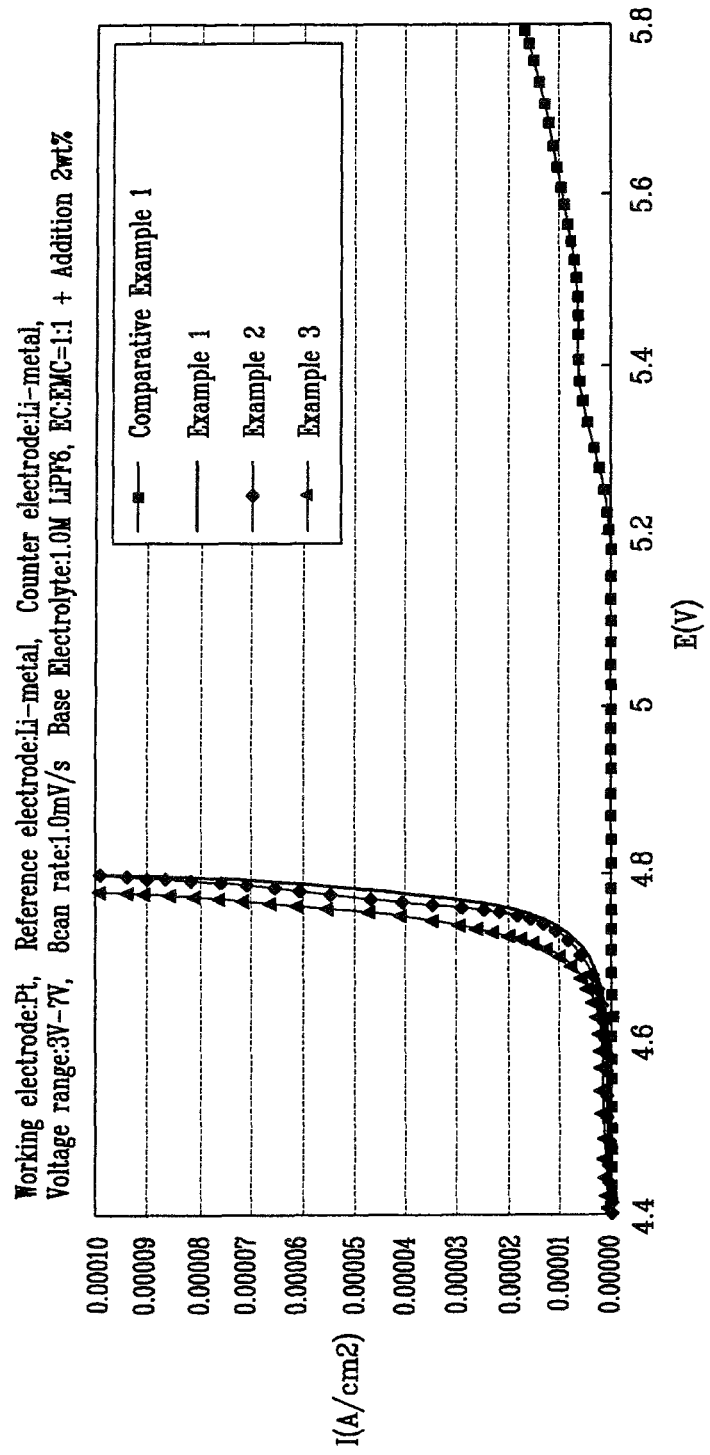
FIG. 2 is a graph showing LSV decomposition start voltages of cells according to Examples 1 to 3 and Comparative Example 1.
Figure 3:
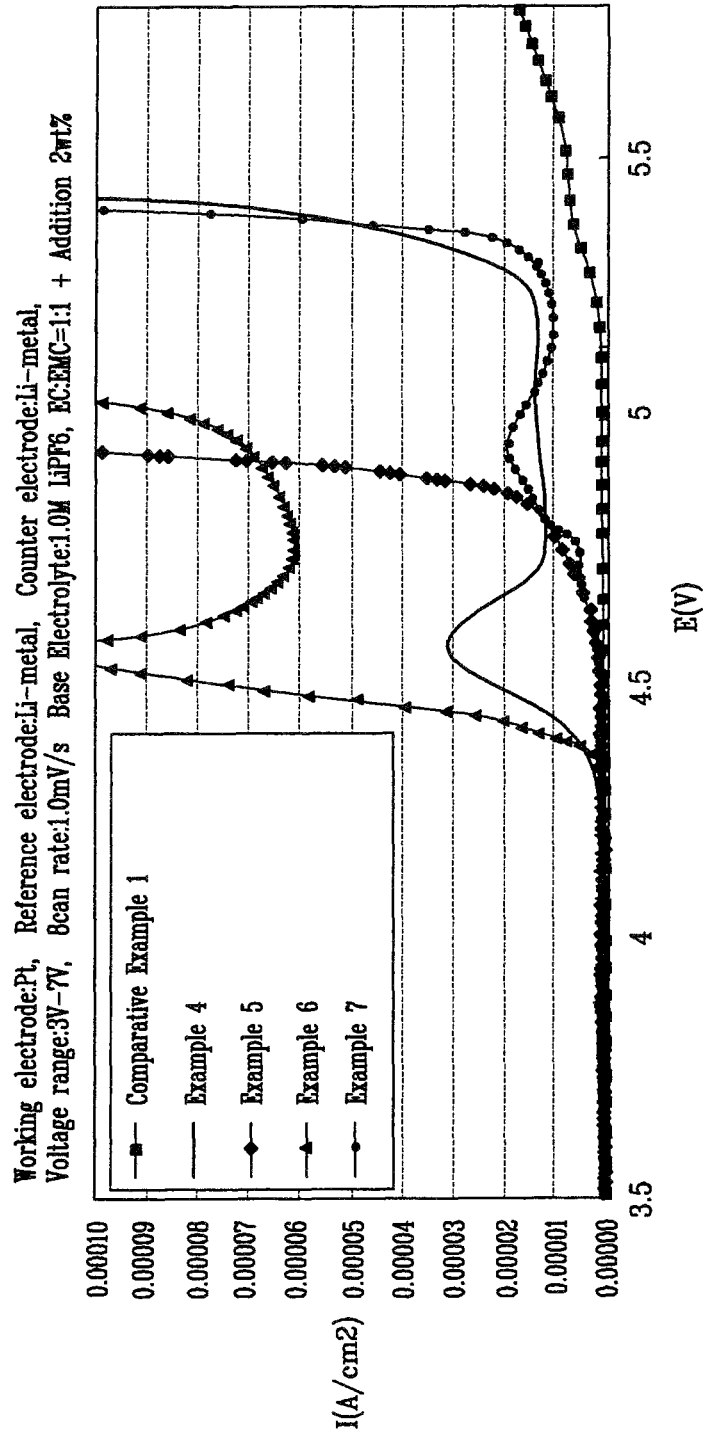
FIG. 3 is a graph showing LSV decomposition start voltages of cells according to Examples 4 to 7 and Comparative Example 1.
Figure 4:
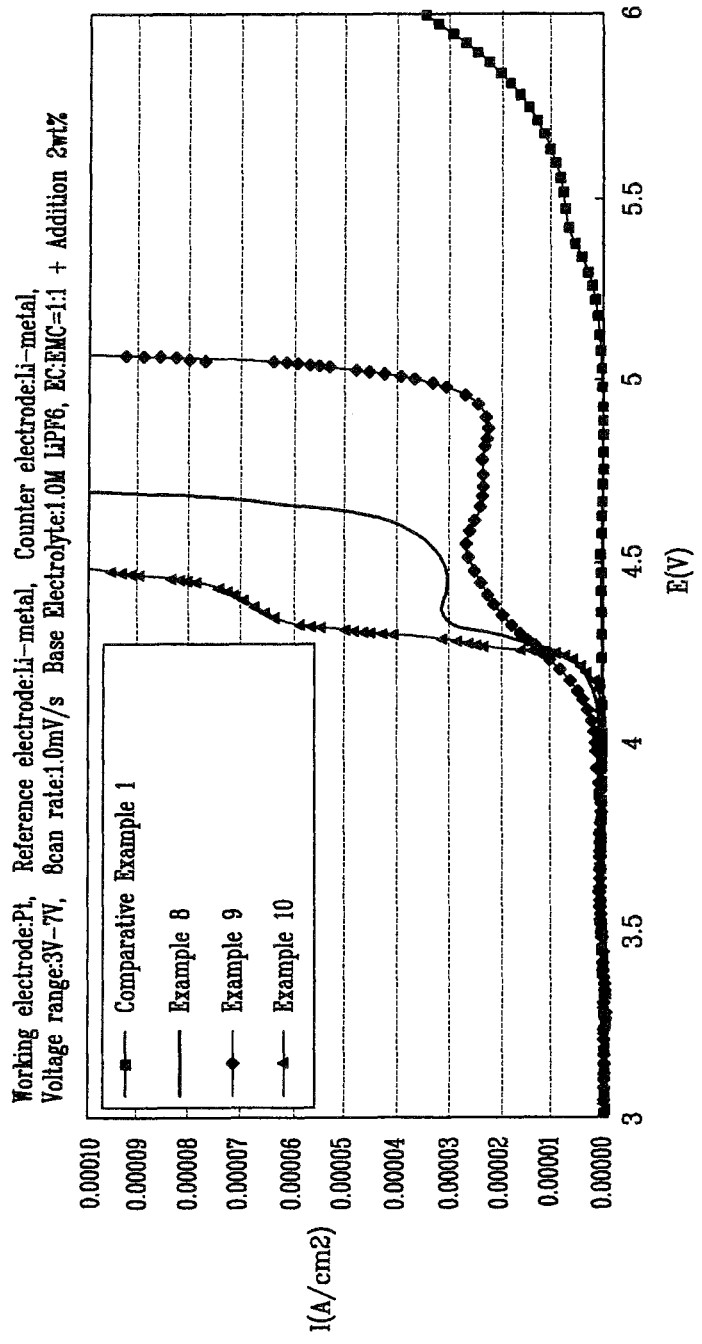
FIG. 4 is a graph showing LSV decomposition start voltages of cells according to Examples 8 to 10 and Comparative Example 1.

Further, the compounds of Examples 1 to 3 and Comparative Example 1 were measured for LSV decomposition start voltage, and the results are shown in FIG. 2. The results of LSV decomposition start voltage for Examples 4 to 7 and Comparative Example 1 are shown in FIG. 3, and those of Examples 8 to 10 and Comparative Example 1 are shown in FIG. 4. As shown in FIGS. 2 to 4, the electric current is remarkably increased at LSV decomposition start voltage. The figures also indicate that compounds of Examples 1 to 10, that is, compounds represented by Formulae 2 to 5 and 10 to 13 have LSV decomposition start voltages lower than that of Comparative Example 1.

After raising the battery voltages to 4.2V, they were overcharged to the overcharge state, then the compounds represented by the above formulae started to decompose and to generate gas. At the same time, the polymerization began, generating the polymerizing heat, and the separator began to shut down due to the heat. In this condition, when the overcharge was further continued, the gas generating amount was increased, then the vent was opened after 30-40 minutes from the start of the overcharge and the overcharge current was blocked. The battery temperature then slowly decreased. Therefore, the additive can ensure battery safety during overcharge compared to a battery without the additive.

EXAMPLE 11

Artificial graphite negative active material was suspended in an aqueous solution of carboxyl methyl cellulose, and a styrene-butadiene rubber binder was added thereto to prepare a negative active material slurry. The obtained slurry was coated on a copper foil with a thickness of 10, dried and compressed to produce a negative electrode. The artificial graphite negative active material had an Lc of 3540 Å, a d(002) of 3.357 Å, a true density of 2.22 g/cm3, a BET (specific surface area) value of 2.5 m$^2$/g, and an average particle diameter (D50) of 18. In addition, the negative active material had an intensity ratio Ra I(1360 cm-1)/I(1580 cm-1) of a Raman spectroscopy peak intensity I(1360) at a (1360) plane to an Raman spectroscopy peak intensity I(1590) at a I(1590) plane of 0.27, and an X-ray peak intensity ratio I(110)/(002), of 0.055.

A LiCoO$_2$ positive active material, a polyvinylidene fluoride binder, and a carbon conductive agent were dispersed at a weight ratio of 92:4:4 in a solvent of N-methyl-2-pyrrolidone to prepare a positive active material slurry. The positive active material was coated on an aluminum foil with a thickness of 15, dried and compressed to produce a positive electrode.

Together with a 16 thick polyethylene separator, the produced electrodes were wound and pressed, then placed into prismatic cans having the dimensions of 46 mm×34 mm×50 mm. An electrolyte was injected into the cans, thereby completing the fabrication of the rechargeable lithium battery cells. For an electrolyte, LiPF$_6$ was added to a mixed solvent of ethylene carbonate and ethylmethyl carbonate (in a 1:1 volume ratio) to be 1.0M to prepare a mixture, and 2.0% by weight of 4-chlorotoluene and 0.2% by weight of bisphenol A diacetate based on the total weight of the mixture were added to the mixture.

EXAMPLE 12

A rechargeable lithium cell was fabricated by the same procedure as in Example 11, except that 2.0% by weight of 4-chlorotoluene and 0.2% by weight of bisphenol A based on the total weight of the mixture were added to the mixture.

EXAMPLE 13

A rechargeable lithium cell was fabricated by the same procedure as in Example 11, except that 2.0% by weight of 4-chlorotoluene and 0.2% by weight of 1,1-diphenylethylene based on the total weight of the mixture were added.

EXAMPLE 14

A rechargeable lithium cell was fabricated by the same procedure as in Example 11, except that 2.0% by weight of 4-bromotoluene and 0.2% by weight of bisphenol A diacetate based on the total weight of the mixture were added.

EXAMPLE 15

A rechargeable lithium cell was fabricated by the same procedure as in Example 11, except that 2.0% by weight of 4-bromotoluene and 0.2% by weight of bisphenol A based on the total weight of the mixture were added.

EXAMPLE 16

A rechargeable lithium cell was fabricated by the same procedure as in Example 11, except that 2.0% by weight of 4-bromotoluene and 0.2% by weight of 1,1-diphenylethylene based on the total weight of the mixture were added.

EXAMPLE 17

A rechargeable lithium cell was fabricated by the same procedure as in Example 11, except that 2.0% by weight of 4-fluorotoluene and 0.2% by weight of bisphenol A diacetate based on the total weight of the mixture were added.

EXAMPLE 15

A rechargeable lithium cell was fabricated by the same procedure as in Example 11, except that 2.0% by weight of 4-fluorotoluene and 0.2% by weight of bisphenol A based on the total weight of the mixture were added.

EXAMPLE 19

A rechargeable lithium cell was fabricated by the same procedure as in Example 11, except that 2.0% by weight of 4-fluorotoluene and 0.2% by weight of 1,1-diphenylethylene based on the total weight of the mixture were added.

EXAMPLE 20

A rechargeable lithium cell was fabricated by the same procedure as in Example 11, except that 2.0% by weight of 4,4'-(hexafluoroisopropylidene)diphenol and 0.2% by weight of bisphenol A diacetate based on the total weight of the mixture were added.

EXAMPLE 21

A rechargeable lithium cell was fabricated by the same procedure as in Example 11, except that 2.0% by weight of 4,4'-(hexafluoroisopropylidene)diphenol and 0.2% by weight of bisphenol A based on the total weight of the mixture were added.

EXAMPLE 22

A rechargeable lithium cell was fabricated by the same procedure as in Example 11, except that 2.0% by weight of 4,4'-(hexafluoroisopropylidene)diphenol and 0.2% by weight of 1,1-diphenylethylene based on the total weight of the mixture were added.

EXAMPLE 23

A rechargeable lithium cell was fabricated by the same procedure as in Example 11, except that 2.0% by weight of 4-phenyl-1,3-dioxane and 0.2% by weight of bisphenol A diacetate based on the total weight of the mixture were added.

EXAMPLE 24

A rechargeable lithium cell was fabricated by the same procedure as in Example 11, except that 2.0% by weight of 4-phenyl-1,3-dioxane and 0.2% by weight of bisphenol A based on the total weight of the mixture were added.

EXAMPLE 25

A rechargeable lithium cell was fabricated by the same procedure as in Example 11, except that 2.0% by weight of 4-phenyl-1,3-dioxane and 0.2% by weight of 1,1-diphenylethylene based on the total weight of the mixture were added.

EXAMPLE 26

A rechargeable lithium cell was fabricated by the same procedure as in Example 11, except that 2.0% by weight of 4,4-cyclohexylidene bisphenol and 0.2% by weight of bisphenol A diacetate based on the total weight of the mixture were added.

EXAMPLE 27

A rechargeable lithium cell was fabricated by the same procedure as in Example 11, except that 2.0% by weight of 4,4-cyclohexylidene bisphenol and 0.2% by weight of bisphenol A based on the total weight of the mixture were added.

EXAMPLE 28

A rechargeable lithium cell was fabricated by the same procedure as in Example 11, except that 2.0% by weight of 4,4-cyclohexylidene bisphenol and 0.2% by weight of 1,1-diphenylethylene based on the total weight of the mixture were added.

EXAMPLE 29

A rechargeable lithium cell was fabricated by the same procedure as in Example 11, except that 2.0% by weight of bisphenol S (4,4'-sulfonyl diphenol) and 0.2% by weight of bisphenol A diacetate based on the total weight of the mixture were added.

EXAMPLE 30

A rechargeable lithium cell was fabricated by the same procedure as in Example 11, except that 2.0% by weight of bisphenol S (4,4'-sulfonyl diphenol) and 0.2% by weight of bisphenol A based on the total weight of the mixture were added.

EXAMPLE 31

A rechargeable lithium cell was fabricated by the same procedure as in Example 11, except that 2.0% by weight of bisphenol S (4,4'-sulfonyl diphenol) and 0.2% by weight of 1,1-diphenylethylene based on the total weight of the mixture were added.

EXAMPLE 32

A rechargeable lithium cell was fabricated by the same procedure as in Example 11, except that 1.50% by weight of 4-chlorotoluene and 1.0% by weight of bisphenol A diacetate based on the total weight of the mixture were added.

EXAMPLE 33

A rechargeable lithium cell was fabricated by the same procedure as in Example 11, except that 10.0% by weight of 4-chlorotoluene and 0.01% by weight of bisphenol A based on the total weight of the mixture were added.

EXAMPLE 34

A rechargeable lithium cell was fabricated by the same procedure as in Example 11, except that 10.0% by weight of 4-chlorotoluene and 0.05% by weight of 1,1-diphenylethylene based on the total weight of the mixture were added.

EXAMPLE 35

A rechargeable lithium cell was fabricated by the same procedure as in Example 11, except that 1.5% by weight of 4-bromotoluene and 1.0% by weight of bisphenol A diacetate based on the total weight of the mixture were added.

EXAMPLE 36

A rechargeable lithium cell was fabricated by the same procedure as in Example 11, except that 10.0% by weight of 4-bromotoluene and 0.01% by weight of bisphenol A based on the total weight of the mixture were added.

EXAMPLE 37

A rechargeable lithium cell was fabricated by the same procedure as in Example 11, except that 10.0% by weight of 4-bromotoluene and 0.05% by weight of 1,1-diphenylethylene based on the total weight of the mixture were added.

EXAMPLE 38

A rechargeable lithium cell was fabricated by the same procedure as in Example 11, except that 1.5% by weight of 4-fluorotoluene and 1.0% by weight of bisphenol A diacetate based on the total weight of the mixture were added.

EXAMPLE 39

A rechargeable lithium cell was fabricated by the same procedure as in Example 11, except that 10.0% by weight of 4-fluorotoluene and 0.01% by weight of bisphenol A based on the total weight of the mixture were added.

EXAMPLE 40

A rechargeable lithium cell was fabricated by the same procedure as in Example 11, except that 10.0% by weight of 4-fluorotoluene and 0.05% by weight of 1,1-diphenyl ethylene based on the total weight of the mixture were added.

EXAMPLE 41

A rechargeable lithium cell was fabricated by the same procedure as in Example 11, except that 1.5% by weight of 4,4'-(hexafluoro isopropylidene) diphenol and 1.0% by weight of bisphenol A diacetate based on the total weight of the mixture were added.

EXAMPLE 42

A rechargeable lithium cell was fabricated by the same procedure as in Example 11, except that 10.0% by weight of 4,4'-(hexafluoro isopropylidene) diphenol and 0.01% by weight of bisphenol A based on the total weight of the mixture were added.

EXAMPLE 43

A rechargeable lithium cell was fabricated by the same procedure as in Example 11, except that 10.0% by weight of 4,4'-(hexafluoro isopropylidene) diphenol and 0.05% by weight of 1,1-diphenylethylene based on the total weight of the mixture were added.

EXAMPLE 44

A rechargeable lithium cell was fabricated by the same procedure as in Example 11, except that 1.5% by weight of 4-phenyl-1,3-dioxane and 1.0% by weight of bisphenol A diacetate based on the total weight of the mixture were added.

EXAMPLE 45

A rechargeable lithium cell was fabricated by the same procedure as in Example 11, except that 10.0% by weight of 4-phenyl-1,3-dioxane and 0.01% by weight of bisphenol A based on the total weight of the mixture were added.

EXAMPLE 46

A rechargeable lithium cell was fabricated by the same procedure as in Example 11, except that 10% by weight of 4-phenyl-1,3-dioxane and 0.05% by weight of 1,1-diphenylethylene based on the total weight of the mixture were added.

EXAMPLE 47

A rechargeable lithium cell was fabricated by the same procedure as in Example 11, except that 1.5% by weight of 4,4-cyclohexylidene bisphenol and 1.0% by weight of bisphenol A diacetate based on the total weight of the mixture were added.

EXAMPLE 48

A rechargeable lithium cell was fabricated by the same procedure as in Example 11, except that 10.0% by weight of 4,4-cyclohexylidene bisphenol and 0.01% by weight of bisphenol A based on the total weight of the mixture were added.

EXAMPLE 49

A rechargeable lithium cell was fabricated by the same procedure as in Example 11, except that 10.0% by weight of 4,4-cyclohexylidene bisphenol and 0.05% by weight of 1,1-diphenylethylene based on the total weight of the mixture were added.

EXAMPLE 50

A rechargeable lithium cell was fabricated by the same procedure as in Example 11, except that 1.5% by weight of bisphenol S(4,4'-sulphonyl diphenol) and 1.0% by weight of bisphenol A diacetate based on the total weight of the mixture were added.

EXAMPLE 51

A rechargeable lithium cell was fabricated by the same procedure as in Example 11, except that 10.0% by weight of bisphenol S(4,4'-sulphonyl diphenol) and 0.01% by weight of bisphenol A based on the total weight of the mixture were added.

EXAMPLE 52

A rechargeable lithium cell was fabricated by the same procedure as in Example 11, except that 10.0% by weight of bisphenol S(4,4'-sulphonyl diphenol) and 0.05% by weight of 1,1-diphenyl ethylene based on the total weight of the mixture were added.

COMPARATIVE EXAMPLE 2

A rechargeable lithium battery cell was fabricated by the same procedure as in Example 11, except that an additive was not added to the electrolyte.

COMPARATIVE EXAMPLE 3

A rechargeable lithium battery cell was fabricated by the same procedure as in Example 11, except that 2.0% by weight of 4-chlorotoluene based on the total weight of the mixture was added.

COMPARATIVE EXAMPLE 4

A rechargeable lithium battery cell was fabricated by the same procedure as in Example 11, except that 2.0% by weight of 4-bromotoluene based on the total weight of the mixture was added.

COMPARATIVE EXAMPLE 5

A rechargeable lithium battery cell was fabricated by the same procedure as in Example 11, except that 2.0% by weight of 4-fluorotoluene based on the total weight of the mixture was added.

COMPARATIVE EXAMPLE 6

A rechargeable lithium battery cell was fabricated by the same procedure as in Example 11, except that 2.0% by weight of 4,4'-(hexafluoro isopropylidene) diphenol based on the total weight of the mixture was added.

COMPARATIVE EXAMPLE 7

A rechargeable lithium battery cell was fabricated by the same procedure as in Example 11, except that 2.0% by weight of 4-phenyl-1,3-dioxane was added based on the total weight of the mixture.

COMPARATIVE EXAMPLE 8

A rechargeable lithium battery cell was fabricated by the same procedure as in Example 11, except that 2.0% by weight of 4,4-cyclohexylidene bisphenol was added based on the total weight of the mixture.

COMPARATIVE EXAMPLE 9

A rechargeable lithium battery cell was fabricated by the same procedure as in Example 11, except that 2.0% by weight of bisphenol S(4,4'-sulphonyl diphenol) was added based on the total weight of the mixture.

COMPARATIVE EXAMPLE 10

A rechargeable lithium battery cell was fabricated by the same procedure as in Example 11, except that 2.0% by weight of bisphenol A diacetate was added based on the total weight of the mixture.

COMPARATIVE EXAMPLE 11

A rechargeable lithium battery cell was fabricated by the same procedure as in Example 11, except that 2.0% by weight of bisphenol A was added based on the total weight of the mixture.

COMPARATIVE EXAMPLE 12

A rechargeable lithium battery cell was fabricated by the same procedure as in Example 11, except that 2.0% by weight of 1,1-diphenyl ethylene was added based on the total weight of the mixture.

COMPARATIVE EXAMPLE 13

A rechargeable lithium battery cell was fabricated by the same procedure as in Example 11, except that 0.2% by weight of bisphenol A diacetate was added based on the total weight of the mixture.

COMPARATIVE EXAMPLE 14

A rechargeable lithium battery cell was fabricated by the same procedure as in Example 11, except that 0.2% by weight of bisphenol A was added based on the total weight of the mixture.

COMPARATIVE EXAMPLE 15

A rechargeable lithium battery cell was fabricated by the same procedure as in Example 11, except that 0.2% by weight of 1,1-diphenyl ethylene was added based on the total weight of the mixture.

The battery cells (battery capacity 1C=790 mAh) fabricated by the procedures of Examples 11 to 52 and Comparative Examples 2 to 15 were charged at constant current and constant voltage at the electric current of 158 mA and the charge voltage of 4.2V, and then allowed to stand for 1 hour followed by discharging at the electric current of 395 mA to 2.75V and being allowed to stand for 1 hour. The procedure was repeated 3 times, then the battery cells were charged at the electric current of 395 mA and the charge voltage of 4.2V for 3 hours.

For the overcharge test, 20 battery cells of each of Examples 11 to 52 and Comparative Examples 2 to 15 were overcharged from the charge state at room temperature (25° C.) under constant current and constant voltage of 1C (790 mAh)/12V for 2.5 hours. The battery cell states were monitored and the results are shown in Tables 2 to 4.

The high temperature storage characteristics were measured by allowing the charged battery cells to stand at 85° C. for 4 days, and the discharge capacity at 0.5 C was measured. The retention recovery ratio was expressed by comparing the discharge capacity at 0.5 C after the 4 days at high temperature as a percentage of the discharge capacity at 0.5 C before the 4 days at high temperature storage.

For the cycle-life characteristics test, the cells according to Examples 11 to 24 and Comparative Example 2 were constant current and constant voltage charged at 1 C/4.2V under a cut-off of 0.1 C and a cut-off discharge of 1 C/3.0V. The capacity retention ratio was expressed by comparing the discharge capacity after 300 cycles as a percentage of the discharge capacity for 1 cycle.

In addition, cycle-life tests were carried out at the high temperature (45° C.) and at room temperature (25° C.).

In Tables 2 to 4, the numbers before L refer to the number of test cells and the measuring criterions of the safety during overcharge are defined as follows:

L0: good, L1: leaking, L2: flashing, L2: sparking, L3: smoking, L4: burning, L5: exploding.

For example, 15L0, 5L4 means that among a total of 20 cells tested, 15 cells were indicated as good, and 5 cells were burning.

TABLE 2

|  | First additive (lower potential-overcharge additive) | Second additive (higher potential-overcharge additive) | LSV decomposition starting voltage (V) | Overcharge | Retention recovery rate at high temperature | Capacity retention at 45° C. for 300 cycles (%) | Capacity retention at room temperature for 300 cycles (%) |
|---|---|---|---|---|---|---|---|
| Example 11 | bisphenol A diacetate | 4-chlorotoluene | 4.50 | 20L0 | 80 | 75 | 85 |
| Example 12 | bisphenol A | 4-chlorotoluene | 4.43 | 20L0 | 77 | 74 | 86 |
| Example 13 | 1,1-diphenylethylene | 4-chlorotoluene | 4.47 | 20L0 | 79 | 76 | 85 |
| Example 14 | bisphenol A diacetate | 4-bromotoluene | 4.56 | 20L0 | 76 | 74 | 87 |
| Example 15 | bisphenol A | 4-bromotoluene | 4.55 | 20L0 | 78 | 75 | 86 |
| Example 16 | 1,1-diphenylethylene | 4-bromotoluene | 4.40 | 20L0 | 77 | 76 | 88 |
| Example 17 | bisphenol A diacetate | 4-fluorotoluene | 4.60 | 20L0 | 76 | 77 | 85 |
| Example 18 | bisphenol A | 4-fluorotoluene | 4.40 | 20L0 | 75 | 74 | 87 |
| Example 19 | 1,1-diphenylethylene | 4-fluorotoluene | 4.46 | 20L0 | 79 | 75 | 85 |
| Example 20 | bisphenol A diacetate | 4,4'-(hexafluoro isopropylidene)diphenol | 4.32 | 20L0 | 75 | 76 | 86 |
| Example 21 | bisphenol A | 4,4'-(hexafluoro isopropylidene)diphenol | 4.30 | 20L0 | 73 | 77 | 89 |
| Example 22 | 1,1-diphenylethylene | 4,4'-(hexafluoro isopropylidene)diphenol | 4.35 | 20L0 | 74 | 75 | 87 |
| Example 23 | bisphenol A diacetate | 4-phenyl-1,3-dioxane | 4.70 | 20L0 | 75 | 76 | 86 |
| Example 24 | bisphenol A | 4-phenyl-1,3-dioxane | 4.50 | 20L0 | 73 | 78 | 87 |
| Example 25 | 1,1-diphenylethylene | 4-phenyl-1,3-dioxane | 4.60 | 20L0 | 76 | 79 | 85 |
| Example 26 | bisphenol A diacetate | 4,4-cyclohexylidene bisphenol | 4.35 | 20L0 | 75 | 75 | 88 |
| Example 27 | bisphenol A | 4,4-cyclohexylidene bisphenol | 4.32 | 20L0 | 74 | 76 | 87 |
| Example 28 | 1,1-diphenylethylene | 4,4-cyclohexylidene bisphenol | 4.36 | 20L0 | 76 | 78 | 86 |
| Example 29 | bisphenol A diacetate | bisphenol S(4,4'-sulfonyldiphenol) | 4.48 | 20L0 | 75 | 77 | 85 |
| Example 30 | bisphenol A | bisphenol S(4,4'-sulfonyldiphenol) | 4.40 | 20L0 | 73 | 75 | 86 |
| Example 31 | 1,1-diphenylethylene | bisphenol S(4,4'-sulfonyldiphenol) | 4.47 | 20L0 | 76 | 76 | 86 |

TABLE 3

|  | First additive (lower potential-overcharge additive) | Second additive (higher potential-overcharge additive) | Overcharge | Retention recovery rate at the high temperature | Capacity retention at 45° for 300 cycles (%) | Capacity retention at room temperature for 300 cycles (%) |
|---|---|---|---|---|---|---|
| Example 32 | bisphenol A diacetate | 4-chlorotoluene | 20L0 | 75 | 74 | 80 |
| Example 33 | bisphenol A | 4-chlorotoluene | 20L0 | 80 | 73 | 88 |
| Example 34 | 1,1-diphenylethylene | 4-chlorotoluene | 20L0 | 80 | 75 | 88 |
| Example 35 | bisphenol A diacetate | 4-bromotoluene | 20L0 | 73 | 76 | 80 |
| Example 36 | bisphenol A | 4-bromotoluene | 20L0 | 79 | 77 | 88 |
| Example 37 | 1,1-diphenylethylene | 4-bromotoluene | 20L0 | 78 | 78 | 89 |
| Example 38 | bisphenol A diacetate | 4-fluorotoluene | 20L0 | 71 | 75 | 79 |
| Example 39 | bisphenol A | 4-fluorotoluene | 20L0 | 77 | 76 | 88 |
| Example 40 | 1,1-diphenylethylene | 4-fluorotoluene | 20L0 | 80 | 77 | 87 |
| Example 41 | bisphenol A diacetate | 4,4'-(hexafluoro isopropylidene)diphenol | 20L0 | 70 | 75 | 82 |
| Example 42 | bisphenol A | 4,4'-(hexafluoro isopropylidene)diphenol | 20L0 | 75 | 76 | 90 |
| Example 43 | 1,1-diphenylethylene | 4,4'-(hexafluoro isopropylidene)diphenol | 20L0 | 77 | 75 | 88 |
| Example 44 | bisphenol A diacetate | 4-phenyl-1,3-dioxane | 20L0 | 71 | 76 | 88 |
| Example 45 | bisphenol A | 4-phenyl-1,3-dioxane | 20L0 | 77 | 74 | 89 |
| Example 46 | 1,1-diphenylethylene | 4-phenyl-1,3-dioxane | 20L0 | 78 | 73 | 87 |
| Example 47 | bisphenol A diacetate | 4,4-cyclohexylidene bisphenol | 20L0 | 72 | 75 | 83 |
| Example 48 | bisphenol A | 4,4-cyclohexylidene bisphenol | 20L0 | 78 | 76 | 88 |
| Example 49 | 1,1-diphenylethylene | 4,4-cyclohexylidene bisphenol | 20L0 | 77 | 77 | 87 |
| Example 50 | bisphenol A diacetate | bisphenol S(4,4'-sulfonyldiphenol) | 20L0 | 71 | 75 | 87 |

TABLE 3-continued

|  | First additive (lower potential-overcharge additive) | Second additive (higher potential-overcharge additive) | Overcharge | Retention recovery rate at the high temperature | Capacity retention at 45° for 300 cycles (%) | Capacity retention at room temperature for 300 cycles (%) |
| --- | --- | --- | --- | --- | --- | --- |
| Example 51 | bisphenol A | bisphenol S(4,4'-sulfonyldiphenol) | 20L0 | 77 | 76 | 87 |
| Example 52 | 1,1-diphenylethylene | bisphenol S(4,4'-sulfonyldiphenol) | 20L0 | 78 | 74 | 89 |

TABLE 4

|  | First additive (lower potential-overcharge additive) | Second additive (higher potential-overcharge additive) | LSV decomposition starting voltage (V) | Overcharge | Retention recovery at high temperature (%) | Capacity retention at 45° C. for 300 cycles (%) | Capacity retention at the room temperature for 300 cycles (%) |
| --- | --- | --- | --- | --- | --- | --- | --- |
| Comparative Example 2 | — | — | 5.64 | 20L5 | 95 | 80 | 91 |
| Comparative Example 3 | 4-chlorotoluene | — | 4.73 | 15L0, 5L4 | 90 | 75 | 86 |
| Comparative Example 4 | 4-bromotoluene | — | 4.73 | 14L0, 6L4 | 85 | 76 | 85 |
| Comparative Example 5 | 4-fluorotoluene | — | 4.70 | 15L0, 5L4 | 87 | 77 | 88 |
| Comparative Example 6 | 4,4'-(hexafluoro isopropylidene)diphenol | — | 4.42 | 18L0, 2L4 | 80 | 75 | 85 |
| Comparative Example 7 | 4-phenyl-1,3-dioxane | — | 4.80 | 10L0, 10L4 | 85 | 75 | 89 |
| Comparative Example 8 | 4,4-cyclohexylidene bisphenol | — | 4.41 | 17L0, 3L4 | 83 | 76 | 84 |
| Comparative Example 9 | Bisphenol S(4,4'-sulfonyldiphenol) | — | 4.48 | 17L0, 3L4 | 84 | 77 | 85 |
| Comparative Example 10 | bisphenol A diacetate | — | 4.26 | 20L0 | 49 | 15 | 38 |
| Comparative Example 11 | bisphenol A | — | 4.25 | 20L0 | 45 | 20 | 40 |
| Comparative Example 12 | 1,1-diphenylethylene | — | 4.26 | 20L0 | 48 | 10 | 25 |
| Comparative Example 13 | bisphenol A diacetate | — | 4.26 | 20L5 | 94 | 75 | 89 |
| Comparative Example 14 | bisphenol A | — | 4.25 | 20L5 | 93 | 76 | 88 |
| Comparative Example 15 | 1,1-diphenylethylene | — | 4.26 | 20L5 | 92 | 73 | 88 |

As shown in Table 4, when the battery of Comparative Example 2 which did not include any additive was overcharged, all 20 cells exploded. Conventionally, in order to ensure battery safety, safety mechanisms such as a charge voltage protection circuit and a current blocking mechanism are installed. However, in the case of Comparative Example 2 no safety protection devices were provided, permitting the explosions to occur.

Further, according to Comparative Example 10, 11 and 12, all of the cells added with bisphenol A diacetate, bisphenol A, or 1,1-diphenylethylene for the overcharge additive having the low oxidation-potential could ensure the safety during overcharge to the L0 level, but they had insufficient retention recovery rates at the high temperature and insufficient capacity retention at 300 cycles, at 50% or less. When the cells were analyzed after standing at the high temperature, it was determined that the surfaces of the positive electrodes were coated with polymer which prevented the charge and discharge reaction of lithium ions and deteriorated the retention recovery rates.

According to Comparative Examples 3 to 9 with additives having relatively higher potentials than those of Comparative Examples 10, 11 and 12, the results on overcharge characteristics were improved compared to that of Comparative Example 2, but having L4 or more was not perfect prevention compared to those of Comparative Examples 10, 11 and 12 all having L0. However, they improved the retention recovery rate at high temperature and the cycle characteristics at 80% or more compared to those of Comparative Examples 10, 11 and 12.

Since the cells according to Comparative Examples 13, 14 and 15 had the additive having the lower oxidation potential added at a low amount of 0.2%, the retention recovery rate at the high temperature and the cycle characteristics were improved, but the safety during overcharge was not ensured. Thereby, it is understood that the single additive cannot provide the desired safety during overcharge, good storage characteristics at high temperature, and good cycle characteristics.

Unlike the cells of Comparative Examples, the cells of Examples 11 to 52 including both the first and the second additives had improved retention recovery rate at the high temperature, up to 70% or more, as shown in Tables 2 and 3, and the capacity retention at 300 cycles was 79% or more. Particularly, the cells of Examples 13, 16, and 29 including the compounds represented by Formula 5 as the higher potential-overcharge additive and the compound represented by Formula 2 as the lower potential-overcharge additive improved the retention recovery rate at the high temperature. In addition, the additive having the lower Linear Sweep Voltametry and slightly reacting during overcharge increased the polarization during overcharge, so that the additive having the higher Linear Sweep Voltametry started the reaction at the early stage to improve the safety during overcharge enough to show that all cells were LO. As a result, batteries having good retention recovery rates at high temperature and good safety during the overcharge can be achieved.

Figure 5:
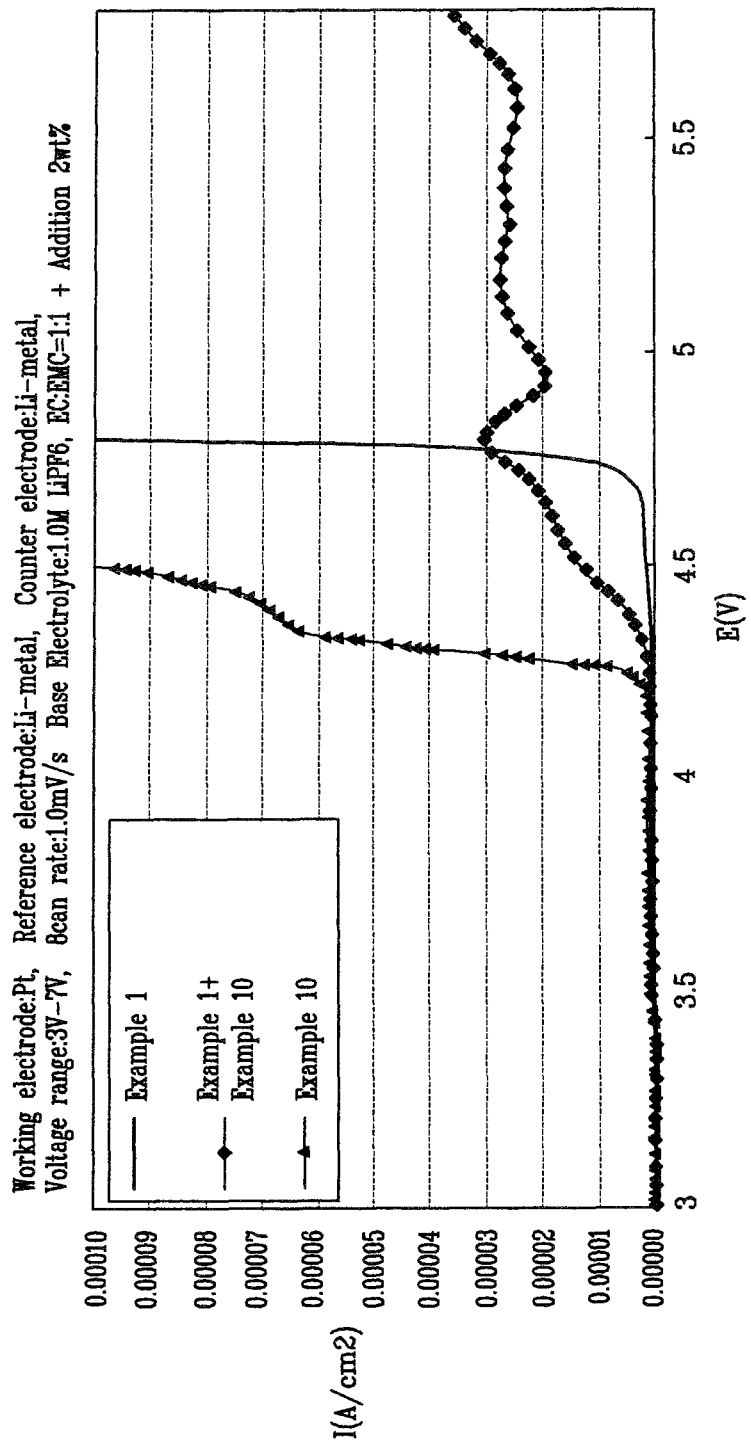
FIG. 5 is a graph showing LSV data when the additive represented by Formula 5 was mixed to the additive represented by Formula 2.

This is supported by the fact that the LSV decomposition start voltage is between those of the higher additive and the lower additive when these additive are mixed. For example, the LSV decomposition start voltage is 4.47V, which is between 4.26 of the lower additive (Formula 2) and 4.73 of the higher additive (Formula 5) when these additives are mixed. FIG. 5 shows LSV data when the additive represented by Formula 5 was mixed to the additive represented by Formula 2.

Further, the cells of Comparative Examples 10 to 12 including only the lower potential-overcharge additive at more than a predetermined amount have good safety during overcharge, but the cycle-life characteristics are remarkably deteriorated due to the side reaction of the lower potential-overcharge additive on the cycle-life at high temperature. The cells according to Comparative Examples 3 to 9 including only the higher potential-overcharge additive improved the cycle-life characteristics, but the overcharge property remarkably deteriorated. However, the cells according to Examples 11 to 52 including both the lower potential-overcharge additive and the higher potential-overcharge additive were satisfactory in terms of both the overcharge property and the cycle-life characteristics at high temperature.

EXAMPLE 53

A rechargeable lithium battery cell was fabricated by the same procedure as in Example 11, except that a polyvinyl pyrrolidone binder was used, a 4-chlorotoluene higher potential-overcharge additive was added in an amount of 5% by weight and a bisphenol A diacetate lower potential-overcharge additive was added in an amount of 0.2% by weight of the total weight of the mixture.

EXAMPLE 54

A rechargeable lithium battery cell was fabricated by the same procedure as in Example 12, except that a polyvinyl pyrrolidone binder was used, a 4-chlorotoluene higher potential-overcharge additive was added in an amount of 5% by weight, and a bisphenol A lower potential-overcharge additive was added in an amount of 0.2% by weight of the total weight of the mixture.

EXAMPLE 55

A rechargeable lithium battery cell was fabricated by the same procedure as in Example 13, except that polyvinyl pyrrolidone was used for the binder of the negative electrode, 4-chlorotoluene for the higher potential-overcharge additive was added in an amount of 5% by weight and a 1,1-diphenyl ethylene lower potential-overcharge additive was added in an amount of 0.2% by weight of the total weight of the mixture.

EXAMPLE 56

A rechargeable lithium battery cell was fabricated by the same procedure as in Example 14, except that a polyvinyl pyrrolidone binder, a 4-bromotoluene higher potential-overcharge additive was added in an amount of 5% by weight and a bisphenol A diacetate lower potential-overcharge additive was added in an amount of 0.2% by weight of the total weight of the mixture.

EXAMPLE 57

A rechargeable lithium battery cell was fabricated by the same procedure as in Example 15, except that a polyvinyl pyrrolidone binder was used, a 4-bromotolene higher potential-overcharge additive was added in an amount of 5% by weight, and a bisphenol A lower potential-overcharge additive was added in an amount of 0.2% by weight of the total weight of the mixture.

EXAMPLE 58

A rechargeable lithium battery cell was fabricated by the same procedure as in Example 16, except that a polyvinyl pyrrolidone binder was used, a 4-bromotoluene higher potential-overcharge additive was added in an amount of 5% by weight and a 1,1,-diphenyl ethylene lower potential-overcharge additive was added in an amount of 0.2% by weight of the total weight of the mixture.

EXAMPLE 59

A rechargeable lithium battery cell was fabricated by the same procedure as in Example 17, except that a polyvinyl pyrrolidone binder was used, a 4-fluorotoluene higher potential-overcharge additive was added in an amount of 5% by weight and a bisphenol A diacetate lower potential-overcharge additive was added in an amount of 0.2% by weight of the total weight of the mixture.

EXAMPLE 60

A rechargeable lithium battery cell was fabricated by the same procedure as in Example 18, except that a polyvinyl pyrrolidone binder was used, a 4-fluorotoluene higher potential-overcharge additive was added in an amount of 5% by weight and a bisphenol A lower potential-overcharge additive was added in an amount of 0.2% by weight of the total weight of the mixture.

EXAMPLE 61

A rechargeable lithium battery cell was fabricated by the same procedure as in Example 19, except that a polyvinyl pyrrolidone binder was used, a 4-fluorotoluene higher potential-overcharge additive was added in an amount of 5% by weight and a 1,1-diphenyl ethylene lower potential-overcharge additive was added in an amount of 0.2% by weight of the total weight of the mixture.

EXAMPLE 62

A rechargeable lithium battery cell was fabricated by the same procedure as in Example 20, except that a polyvinyl pyrrolidone binder was used, a 4,4'-(hexafluoroisopropylene) dipheneol higher potential-overcharge additive was added in an amount of 5% by weight and a bisphenol A diacetate lower potential-overcharge additive was added in an amount of 0.2% by weight of the total weight of the mixture.

EXAMPLE 63

A rechargeable lithium battery cell was fabricated by the same procedure as in Example 21, except that a polyvinyl pyrrolidone binder was used, a 4,4'-(hexafluoroisopropylene) dipheneol higher potential-overcharge additive was added in an amount of 5% by weight and a bisphenol A lower potential-overcharge additive was added in an amount of 0.2% by weight of the total weight of the mixture.

EXAMPLE 64

A rechargeable lithium battery cell was fabricated by the same procedure as in Example 22, except that a polyvinyl pyrrolidone binder was used, a 4,4'-(hexafluoroisopropylene) dipheneol higher potential-overcharge additive was added in an amount of 5% by weight and a 1,1-diphenyl ethylene lower potential-overcharge additive was added in an amount of 0.2% by weight of the total weight of the mixture.

EXAMPLE 65

A rechargeable lithium battery cell was fabricated by the same procedure as in Example 23, except that a polyvinyl pyrrolidone binder was used, a 4-phenyl-1,3-dioxane higher potential-overcharge additive was added in an amount of 5% by weight and a bisphenol A diacetate lower potential-overcharge additive was added in an amount of 0.2% by weight of the total weight of the mixture.

EXAMPLE 66

A rechargeable lithium battery cell was fabricated by the same procedure as in Example 24, except that a polyvinyl pyrrolidone binder was used, a 4-phenyl-1,3-dioxane higher potential-overcharge additive was added in an amount of 5% by weight and a bisphenol A lower potential-overcharge additive was added in an amount of 0.2% by weight of the total weight of the mixture.

EXAMPLE 67

A rechargeable lithium battery cell was fabricated by the same procedure as in Example 25, except that a polyvinyl pyrrolidone binder was used, a 4-phenyl-1,3-dioxane higher potential-overcharge additive was added in an amount of 5% by weight and a 1,1-diphenyl ethylene lower potential-overcharge additive was added in an amount of 0.2% by weight of the total weight of the mixture.

EXAMPLE 68

A rechargeable lithium battery cell was fabricated by the same procedure as in Example 26, except that a polyvinyl pyrrolidone binder was used, a 4,4-cyclohexylidene bisphenol higher potential-overcharge additive was added in an amount of 5% by weight and a bisphenol A diacetate lower potential-overcharge additive was added in an amount of 0.2% by weight of the total weight of the mixture.

EXAMPLE 69

A rechargeable lithium battery cell was fabricated by the same procedure as in Example 27, except that a polyvinyl pyrrolidone binder was used, a 4,4-cyclohexylidene bisphenol higher potential-overcharge additive was added in an amount of 5% by weight and a bisphenol A lower potential-overcharge additive was added in an amount of 0.2% by weight of the total weight of the mixture.

EXAMPLE 70

A rechargeable lithium battery cell was fabricated by the same procedure as in Example 28, except that a polyvinyl pyrrolidone binder was used, a 4,4-cyclohexylidene bisphenol higher potential-overcharge additive was added in an amount of 5% by weight and a 1,1-diphenyl ethylene lower potential-overcharge additive was added in an amount of 0.2% by weight of the total weight of the mixture.

EXAMPLE 71

A rechargeable lithium battery cell was fabricated by the same procedure as in Example 29, except that a polyvinyl pyrrolidone binder was used, a bisphenol S(4,4'-sulfonyl diphenol) higher potential-overcharge additive was added in an amount of 5% by weight and a bisphenol A diacetate lower potential-overcharge additive was added in an amount of 0.2% by weight of the total weight of the mixture.

EXAMPLE 72

A rechargeable lithium battery cell was fabricated by the same procedure as in Example 30, except that a polyvinyl pyrrolidone binder was used, a bisphenol S(4,4'-sulfonyl diphenol) higher potential-overcharge additive was added in an amount of 5% by weight and a bisphenol A lower potential-overcharge additive was added in an amount of 0.2% by weight of the total weight of the mixture.

EXAMPLE 73

A rechargeable lithium battery cell was fabricated by the same procedure as in Example 31, except that a polyvinyl pyrrolidone binder was used, a bisphenol S(4,4'-sulfonyl diphenol) higher potential-overcharge additive was added in an amount of 5% by weight and a 1,1-diphenyl ethylene lower potential-overcharge additive was added in an amount of 0.2% by weight of the total weight of the mixture.

EXAMPLE 74

A rechargeable lithium battery cell was fabricated by the same procedure as in Example 32, except that a polyvinyl pyrrolidone binder was used, a 4-chlorotoluene higher potential-overcharge additive was added in an amount of 10% by weight and a bisphenol A diacetate lower potential-overcharge additive added in an amount of 0.5% by weight of the total weight of the mixture.

EXAMPLE 75

A rechargeable lithium battery cell was fabricated by the same procedure as in Example 33, except that a polyvinyl pyrrolidone binder was used, a 4-chlorotoluene higher potential-overcharge additive was added in an amount of 10% by weight and a bisphenol A lower potential-overcharge additive was added in an amount of 0.5% by weight of the total weight of the mixture.

EXAMPLE 76

A rechargeable lithium battery cell was fabricated by the same procedure as in Example 34, except that a polyvinyl pyrrolidone binder was used, a 4-chlorotoluene higher potential-overcharge additive was added in an amount of 10% by weight and a 1,1-diphenyl ethylene lower potential-overcharge additive was added in an amount of 0.5% by weight of the total weight of the mixture.

EXAMPLE 77

A rechargeable lithium battery cell was fabricated by the same procedure as in Example 35, except that a polyvinyl pyrrolidone binder was used, a 4-bromoetoluene higher potential-overcharge additive was added in an amount of 10% by weight and a bisphenol A diacetate lower potential-overcharge additive was added in an amount of 0.5% by weight of the total weight of the mixture.

EXAMPLE 78

A rechargeable lithium battery cell was fabricated by the same procedure as in Example 36, except that a polyvinyl pyrrolidone binder was used, a 4-bromotoluene higher potential-overcharge additive was added in an amount of 10% by weight and a bisphenol A lower potential-overcharge additive was added in an amount of 0.5% by weight of the total weight of the mixture.

EXAMPLE 79

A rechargeable lithium battery cell was fabricated by the same procedure as in Example 37, except that a polyvinyl pyrrolidone binder was used, a 4-bromotoluene higher potential-overcharge additive was added in an amount of 10% by weight and a 1,1-diphenyl ethylene lower potential-overcharge additive was added in an amount of 0.5% by weight of the total weight of the mixture.

EXAMPLE 80

A rechargeable lithium battery cell was fabricated by the same procedure as in Example 38, except that a polyvinyl pyrrolidone binder was used, a 4-fluorotoluene higher potential-overcharge additive was added in an amount of 10% by weight and a bisphenol A diacetate lower potential-overcharge-additive was added in an amount of 0.5% by weight of the total weight of the mixture.

EXAMPLE 81

A rechargeable lithium battery cell was fabricated by the same procedure as in Example 39, except that a polyvinyl pyrrolidone binder was used, a 4-fluorotoluene higher potential-overcharge additive was added in an amount of 10% by weight and a bisphenol A lower potential-overcharge additive was added in an amount of 0.5% by weight of the total weight of the mixture.

EXAMPLE 82

A rechargeable lithium battery cell was fabricated by the same procedure as in Example 40, except that a polyvinyl pyrrolidone binder was used, a 4-bromotoluene higher potential-overcharge additive was added in an amount of 10% by weight and a 1,1-diphenyl ethylene lower potential-overcharge additive was added in an amount of 0.5% by weight of the total weight of the mixture.

EXAMPLE 83

A rechargeable lithium battery cell was fabricated by the same procedure as in Example 41, except that a polyvinyl pyrrolidone binder was used, a 4,4'-(hexafluoroisopropylidene) diphenol higher potential-overcharge additive was added in an amount of 10% by weight and a bisphenol A diacetate lower potential-overcharge additive was added in an amount of 0.5% by weight of the total weight of the mixture.

EXAMPLE 84

A rechargeable lithium battery cell was fabricated by the same procedure as in Example 42, except that a polyvinyl pyrrolidone binder was used, a 4,4'-(hexafluoroisopropylidene) diphenol higher potential-overcharge additive was added in an amount of 10% by weight and a bisphenol A lower potential-overcharge additive was added in an amount of 0.5% by weight of the total weight of the mixture.

EXAMPLE 85

A rechargeable lithium battery cell was fabricated by the same procedure as in Example 43, except that a polyvinyl pyrrolidone binder was used, a 4,4'-(hexafluoroisopropylidene) diphenol higher potential-overcharge additive was added in an amount of 10% by weight and a 1,1-diphenyl ethylene lower potential-overcharge additive was added in an amount of 0.5% by weight of the total weight of the mixture.

EXAMPLE 86

A rechargeable lithium battery cell was fabricated by the same procedure as in Example 44, except that a polyvinyl pyrrolidone binder was used, a 4-phenyl-1,3-dioxane higher potential-overcharge additive was added in an amount of 10% by weight and a bisphenol A diacetate lower potential-overcharge additive was added in an amount of 0.5% by weight of the total weight of the mixture.

EXAMPLE 87

A rechargeable lithium battery cell was fabricated by the same procedure as in Example 45, except that a polyvinyl pyrrolidone binder was used, a 4-phenyl-1,3-dioxane higher potential-overcharge additive was added in an amount of 10% by weight and a bisphenol A lower potential-overcharge additive was added in an amount of 0.5% by weight of the total weight of the mixture.

EXAMPLE 88

A rechargeable lithium battery cell was fabricated by the same procedure as in Example 46, except that a polyvinyl pyrrolidone binder was used, a 4-phenyl-1,3-dioxane higher potential-overcharge additive was added in an amount of 10% by weight and a 1,1-diphenyl ethylene lower potential-overcharge additive was added in an amount of 0.5% by weight of the total weight of the mixture.

EXAMPLE 89

A rechargeable lithium battery cell was fabricated by the same procedure as in Example 47, except that a polyvinyl pyrrolidone binder was used, a 4,4-cyclohexylidene bisphenol higher potential overcharge additive was added in an amount of 10% by weight and a bisphenol A diacetate lower potential-overcharge additive was added in an amount of 0.5% by weight of the total weight of the mixture.

EXAMPLE 90

A rechargeable lithium battery cell was fabricated by the same procedure as in Example 48, except that a polyvinyl pyrrolidone binder was used, a 4,4-cyclohexylidene bisphenol higher potential-overcharge additive was added in an amount of 10% by weight and a bisphenol A lower potential-overcharge additive was added in an amount of 0.5% by weight of the total weight of the mixture.

EXAMPLE 91

A rechargeable lithium battery cell was fabricated by the same procedure as in Example 49, except that a polyvinyl pyrrolidone binder was used, a 4,4-cyclohexylidene bisphenol higher potential-overcharge additive was added in an amount of 10% by weight and a 1,1-diphenyl ethylene lower potential-overcharge additive was added in an amount of 0.5% by weight of the total weight of the mixture.

EXAMPLE 92

A rechargeable lithium battery cell was fabricated by the same procedure as in Example 50, except that a polyvinyl pyrrolidone binder was used, a bisphenol S(4,4'-sulfonyl diphenol) higher potential-overcharge additive was added in an amount of 10% by weight and a bisphenol A diacetate lower potential-overcharge additive was added in an amount of 0.5% by weight of the total weight of the mixture.

EXAMPLE 93

A rechargeable lithium battery cell was fabricated by the same procedure as in Example 51, except that a polyvinyl pyrrolidone binder was used, a bisphenol S(4,4'-sulfonyl diphenol) higher potential-overcharge additive was added in an amount of 10% by weight and a bisphenol A lower potential-overcharge additive was added in an amount of 0.5% by weight of the total weight of the mixture.

EXAMPLE 94

A rechargeable lithium battery cell was fabricated by the same procedure as in Example 52, except that a polyvinyl pyrrolidone binder was used, a bisphenol S(4,4'-sulfonyl diphenol) higher potential-overcharge additive was added in an amount of 10% by weight and a 1,1-diphenyl ethylene lower potential-overcharge additive was added in an amount of 0.5% by weight of the total weight of the mixture.

The cells fabricated by procedures of Examples 53 to 94 (battery capacity 1 C=790 mAh) were charged at an electric current of 158 mA and a charge voltage of 4.2V under constant current and constant voltage and allowed to stand for one hour followed by discharging at the electric current of 395 mA and 2.75V over one hour. These steps were repeated three times, and the cells were then charged at the electric current of 395 mA and the charge voltage of 4.2V for three hours.

For the overcharge test, 20 cells each of Examples 53 to 94 were charged at room temperature (25° C.), and then overcharged under the condition of constant current and constant voltage of 10 (790 mAh) and 12V for 2.5 hours. The cells were monitored and the results are shown in Tables 5 and 6.

The high temperature storage characteristics were measured by allowing the charged cells to stand at 85° C. for 4 days, and the discharge capacity was measured. The retention recovery rate was expressed by comparing the discharge capacity at 0.5 C after 4 days at high temperature as a percentage of the discharge capacity at 0.5 C before the 4 days at high temperature.

To test of the cycle-life characteristics, the cells were cut-off charged at 0.1 C and cut-off discharged at 1 C/4.2V under constant current and constant voltage. The capacity retention was expressed by comparing the discharge capacity after 300 cycles as a percentage of the discharge capacity at the first cycle.

In Tables 5 and 6, the number before "L" means the number of test cells, and the condition for measuring the safety during overcharge was identical to that of Table 2.

TABLE 5

| | First additive (lower potential-overcharge additive) | Second additive (higher potential-overcharge additive) | LSV decomposition initiation voltage (V) | Overcharge | Retention recovery rate at high temperature (%) | Capacity retention at 300 cycles (%) |
|---|---|---|---|---|---|---|
| Example 53 | bisphenol A diacetate | 4-chlorotoluene | 4.50 | 20L0 | 83 | 87 |
| Example 54 | bisphenol A | 4-chlorotoluene | 4.43 | 20L0 | 75 | 83 |
| Example 55 | 1,1-diphenylethylene | 4-chlorotoluene | 4.47 | 20L0 | 78 | 83 |
| Example 56 | bisphenol A diacetate | 4-bromotoluene | 4.56 | 20L0 | 78 | 86 |
| Example 57 | bisphenol A | 4-bromotoluene | 4.55 | 20L0 | 79 | 84 |
| Example 58 | 1,1-diphenylethylene | 4-bromotoluene | 4.40 | 20L0 | 76 | 85 |
| Example 59 | bisphenol A diacetate | 4-fluorotoluene | 4.60 | 20L0 | 77 | 83 |
| Example 60 | bisphenol A | 4-fluorotoluene | 4.40 | 20L0 | 76 | 86 |
| Example 61 | 1,1-diphenylethylene | 4-fluorotoluene | 4.46 | 20L0 | 77 | 86 |
| Example 62 | bisphenol A diacetate | 4,4'-(hexafluoro isopropylidene)diphenol | 4.32 | 20L0 | 76 | 83 |
| Example 63 | bisphenol A | 4,4'-(hexafluoro isopropylidene)diphenol | 4.30 | 20L0 | 73 | 82 |
| Example 64 | 1,1-diphenylethylene | 4,4'-(hexafluoro isopropylidene)diphenol | 4.35 | 20L0 | 75 | 84 |
| Example 65 | bisphenol A diacetate | 4-phenyl-1,3-dioxane | 4.70 | 20L0 | 75 | 87 |
| Example 66 | bisphenol A | 4-phenyl-1,3-dioxane | 4.50 | 20L0 | 74 | 87 |
| Example 67 | 1,1-diphenylethylene | 4-phenyl-1,3-dioxane | 4.60 | 20L0 | 78 | 86 |
| Example 68 | bisphenol A diacetate | 4,4-cyclohexylidene bisphenol | 4.35 | 20L0 | 76 | 82 |
| Example 69 | bisphenol A | 4,4-cyclohexylidene bisphenol | 4.32 | 20L0 | 74 | 81 |
| Example 70 | 1,1-diphenylethylene | 4,4-cyclohexylidene bisphenol | 4.36 | 20L0 | 78 | 82 |
| Example 71 | bisphenol A diacetate | bisphenol S(4,4'-sulfonyldiphenol) | 4.48 | 20L0 | 75 | 85 |
| Example 72 | bisphenol A | bisphenol S(4,4'-sulfonyldiphenol) | 4.40 | 20L0 | 78 | 85 |
| Example 73 | 1,1-diphenylethylene | bisphenol S(4,4'-sulfonyldiphenol) | 4.47 | 20L0 | 77 | 86 |

TABLE 6

| | First additive (lower potential-overcharge additive) | Second additive (higher potential-overcharge additive) | Overcharge | Retention recovery rate at high temperature (%) | Capacity retention at 300 cycles (%) |
|---|---|---|---|---|---|
| Example 74 | bisphenol A diacetate | 4-chlorotoluene | 20L0 | 76 | 83 |
| Example 75 | bisphenol A | 4-chlorotoluene | 20L0 | 79 | 87 |
| Example 76 | 1,1-diphenylethylene | 4-chlorotoluene | 20L0 | 80 | 88 |
| Example 77 | bisphenol A diacetate | 4-bromotoluene | 20L0 | 75 | 81 |
| Example 78 | bisphenol A | 4-bromotoluene | 20L0 | 79 | 87 |
| Example 79 | 1,1-diphenylethylene | 4-bromotoluene | 20L0 | 76 | 87 |
| Example 80 | bisphenol A diacetate | 4-fluorotoluene | 20L0 | 71 | 79 |
| Example 81 | bisphenol A | 4-fluorotoluene | 20L0 | 77 | 89 |
| Example 82 | 1,1-diphenylethylene | 4-fluorotoluene | 20L0 | 82 | 87 |
| Example 83 | bisphenol A diacetate | 4,4'-(hexafluoro isopropylidene)diphenol | 20L0 | 70 | 85 |
| Example 84 | bisphenol A | 4,4'-(hexafluoro isopropylidene)diphenol | 20L0 | 75 | 90 |
| Example 85 | 1,1-diphenylethylene | 4,4'-(hexafluoro isopropylidene)diphenol | 20L0 | 78 | 88 |
| Example 86 | bisphenol A diacetate | 4-phenyl-1,3-dioxane | 20L0 | 71 | 87 |
| Example 87 | bisphenol A | 4-phenyl-1,3-dioxane | 20L0 | 77 | 85 |
| Example 88 | 1,1-diphenylethylene | 4-phenyl-1,3-dioxane | 20L0 | 78 | 85 |
| Example 89 | bisphenol A diacetate | 4,4-cyclohexylidene bisphenol | 20L0 | 72 | 83 |
| Example 90 | bisphenol A | 4,4-cyclohexylidene bisphenol | 20L0 | 75 | 88 |
| Example 91 | 1,1-diphenylethylene | 4,4-cyclohexylidene bisphenol | 20L0 | 77 | 88 |
| Example 92 | bisphenol A diacetate | bisphenol S(4,4'-sulfonyldiphenol) | 20L0 | 71 | 86 |
| Example 93 | bisphenol A | bisphenol S(4,4'-sulfonyldiphenol) | 20L0 | 75 | 87 |
| Example 94 | 1,1-diphenylethylene | bisphenol S(4,4'-sulfonyldiphenol) | 20L0 | 78 | 88 |

COMPARATIVE EXAMPLE 16

A rechargeable lithium battery cell was fabricated by the same procedure as in Example 11, except that a 4-chlorotoluene and a 4-bromotoluene higher potential-overcharge additive were respectively added in an amount of 1.0% by weight and 1.0% by weight and a lower potential-overcharge additive was not added.

COMPARATIVE EXAMPLE 17

A rechargeable lithium battery cell was fabricated by the same procedure as in Example 11, except that a 4-fluorotoluene and a 4,4'-(hexafluoro isopropylidene)diphenol higher potential-overcharge additive were respectively added in an amount of 1.0% by weight and 1.0% by weight and the lower potential-overcharge additive was not added.

COMPARATIVE EXAMPLE 18

A rechargeable lithium battery cell was fabricated by the same procedure as in Example 11, except that a 4-phenyl-1,3-dioxane and a 4,4'-(hexafluoro isopropylidene)diphenol higher potential-overcharge additive were respectively added in an amount of 1.0% by weight and 1.0% by weight and a lower potential-overcharge additive was not added.

COMPARATIVE EXAMPLE 19

A rechargeable lithium battery cell was fabricated by the same procedure as in Example 11, except that a bisphenol A diacetate and bisphenol A lower potential-overcharge additive were respectively added in an amount of 1.0% by weight and 1.0% by weight and a higher potential-overcharge additive was not added.

COMPARATIVE EXAMPLE 20

A rechargeable lithium battery cell was fabricated by the same procedure as in Example 11, except that a 1,1-diphenylethylene and bisphenol A lower potential-overcharge additive were respectively added in an amount of 1.0% by weight and 1.0% by weight and a higher potential-overcharge additive was not added.

COMPARATIVE EXAMPLE 21

A rechargeable lithium battery cell was fabricated by the same procedure as in Example 11, except that a 4-chlorotoluene higher potential-overcharge additive was respectively added in an amount of 25% by weight and a lower potential-overcharge additive was not added.

COMPARATIVE EXAMPLE 22

A rechargeable lithium battery cell was fabricated by the same procedure as in Example 11, except that a 1,1-diphenylethylene lower potential-overcharge additive was added in an amount of 25% by weight and a higher potential-overcharge additive was not added.

COMPARATIVE EXAMPLE 23

A rechargeable lithium battery cell was fabricated by the same procedure as in Example 11, except that a 4-chlorotoluene higher potential-overcharge additive was added in an amount of 20% by weight and a 1,1-diphenylethylene lower potential-overcharge additive was added in an amount of 5% by weight.

The cells fabricated by procedures according to comparative Examples 16 to 23 (battery capacity 1 C=790 mAh) were constant current and constant voltage charged at 158 mA and 4.2V, and then allowed to stand for 1 hour followed by discharging at 395 mA and 2.75V and being allowed to stand for 1 hour. These procedures were repeated 3 times, and the resulting cells were then charged at 395 mA and 4.2V for 3 hours.

Subsequently, each set of 20 cells fabricated by procedures according to Examples 16 to 23 were constant current and constant voltage overcharged at 1 C (790 mAh) by 12V at room temperature (25° C.) for 2.5 hours. The cells were monitored, and the results are shown in Table 7.

Further, these charged cells were allowed to stand at 85° C. for 4 days, and the discharge capacity was measured. The recovery rate was expressed by comparing the discharge capacity at 0.5 C after the cell was allowed to stand at the high temperature for 4 days as a percentage of the discharge capacity at 0.5 C before the 4 days of high temperature storage.

The cycle life test was performed by constant current/constant voltage charging at 1 C at 4V under a cut-off of 0.1 C, and discharging at 1 C under a cut-off voltage of 3.0V, for 300 cycles. The capacity retention was expressed by comparing the discharge capacity after 300 cycles as a percentage of the discharge capacity at 1 cycle. The cycle-life test was carried out under both a high temperature (45° C.) and at room temperature (25° C.).

In Table 7, the number before "L" means the number of test cells, and the conditions for measuring the overcharge safety were identical to those of the Table 2.

What is claimed is:

1. A rechargeable lithium battery, comprising:
   an electrolyte comprising a first additive having an oxidation potential from 4.1 to 4.5V, a second additive having an oxidation potential from 4.5 to 5.0V, a non-aqueous organic solvent, and a lithium salt;
   a positive electrode comprising a positive active material capable of reversibly intercalating and deintercalating lithium ions; and
   a negative electrode capable of reversibly intercalating and deintercalating lithium ions,
   wherein at least one of the positive electrode and the negative electrode comprises a water soluble binder and a water soluble agent for increasing viscosity and wherein the first additive comprises a compound represented by Formula 2:

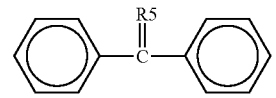

Formula 2 wherein R5 is selected from the group consisting of $C_1$-$C_6$ alkyl groups and $C_2$-$C_6$ alkylene groups.

TABLE 7

| | First additive (lower potential-overcharge additive) | Second additive (higher potential-overcharge additive) | LSV decomposition start voltage (V) | Overcharge | Retention recovery rate (%) | Capacity retention at 45° C. for 300 cycles (%) | Capacity retention at room temperature for 300 cycles (%) |
|---|---|---|---|---|---|---|---|
| Comparative Example 16 | — | 4-chlorotoluene/ 4-bromotoluene | 4.73 | 12L0, 8L5 | 95 | 76 | 91 |
| Comparative Example 17 | — | 4-fluorotoluene/4,4'-(hexafluoro isopropylidene)diphenol | 4.72 | 15L0, 5L4 | 90 | 77 | 86 |
| Comparative Example 18 | — | 4-phenyl-1,3-dioxane/4,4-cyclohexylidene bisphenol | 4.74 | 14L0, 6L4 | 85 | 78 | 85 |
| Comparative Example 19 | bisphenol A diacetate/ bisphenol A | | 4.25 | 20L0 | 42 | 32 | 43 |
| Comparative Example 20 | 1,1-diphenylethylene/ bisphenol A | | 4.22 | 20L0 | 42 | 25 | 34 |
| Comparative Example 21 | — | 4-chlorotoluene | 4.73 | 19L0, 1L4 | 53 | 43 | 49 |
| Comparative Example 22 | 1,1-diphenylethylene | — | 4.26 | 20L0 | 2 | 0 | 0 |
| Comparative Example 23 | 1,1-diphenylethylene | 4-chlorotoluene | 4.47 | 20L0 | 15 | 0 | 0 |

As shown in Table 7, cells according to Comparative Examples 17 and 18 including only a higher potential-overcharge additive exhibited deteriorated overcharge characteristics, but cells according to Comparative Examples 19 and 20 including only a lower potential-overcharge additive exhibited both deteriorated cycle-life characteristics and deteriorated storing characteristics.

Further, cells according to Comparative Examples 21 to 23 including 25 wt % of a higher potential-overcharge additive, a lower potential-overcharge additive, or a mixture thereof, deteriorated on the storage characteristics and the cycle-life characteristics.

As described above, an electrolyte for a rechargeable lithium battery according to the present invention including a higher oxidation-potential additive and a lower oxidation-potential additive can provide a battery with improved safety during high temperature storage with good cycle-life characteristics.

2. The rechargeable lithium battery according to claim 1, wherein the second additive comprises a compound represented by Formula 5:

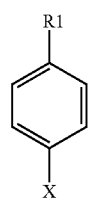

Formula 5 wherein X is selected from the group consisting of Cl, Br, and F, and R1 is selected from the group consisting of $C_1$-$C_6$ alkyl groups and $C_2$-$C_6$ alkylene groups.

* * * * *